(12) United States Patent
Niihara et al.

(10) Patent No.: US 8,790,028 B2
(45) Date of Patent: Jul. 29, 2014

(54) IMAGE FORMING APPARATUS WITH OFFSET UPPER AND LOWER SHEET ROLL SUPPORTERS

(75) Inventors: Takayuki Niihara, Atsugi (JP);
Masahiko Yamada, Machida (JP);
Yuichiro Maeyama, Kawasaki (JP);
Masato Ogawa, Sagamihara (JP)

(73) Assignee: Ricoh Company, Limited, Tokyo (JP)

( * ) Notice: Subject to any disclaimer, the term of this patent is extended or adjusted under 35 U.S.C. 154(b) by 458 days.

(21) Appl. No.: 12/923,269

(22) Filed: Sep. 13, 2010

(65) Prior Publication Data
US 2011/0063644 A1 Mar. 17, 2011

(30) Foreign Application Priority Data

Sep. 14, 2009 (JP) .................................. 2009-212438
Jun. 29, 2010 (JP) .................................. 2010-148019

(51) Int. Cl.
*B41J 15/04* (2006.01)
*B41J 29/02* (2006.01)

(52) U.S. Cl.
CPC ................. *B41J 15/042* (2013.01); *B41J 15/04* (2013.01); *B41J 29/02* (2013.01)
USPC ............ 400/613; 400/619; 400/691; 400/693

(58) Field of Classification Search
CPC ................................ B41J 15/042; B41J 29/02
USPC .................... 400/613, 619, 691, 693
See application file for complete search history.

(56) References Cited

U.S. PATENT DOCUMENTS

| | | | | |
|---|---|---|---|---|
| 3,276,706 A | | 10/1966 | House .......................... 242/564.3 |
| 3,684,373 A | * | 8/1972 | Berge et al. .................... 355/111 |
| 3,951,023 A | * | 4/1976 | Ashburner ....................... 83/110 |
| 4,304,369 A | | 12/1981 | Landsness ................. 242/421.3 |
| 5,828,939 A | | 10/1998 | Yoshiuchi et al. ............. 399/388 |

(Continued)

FOREIGN PATENT DOCUMENTS

| | | | | |
|---|---|---|---|---|
| JP | 59229370 A | * | 12/1984 | ............... B41J 11/70 |
| JP | 02-113973 | | 4/1990 | |

(Continued)

OTHER PUBLICATIONS

Office Action for corresponding U.S. Appl. No. 12/923,270 dated Oct. 22, 2012.

(Continued)

*Primary Examiner* — Daniel J Colilla
(74) *Attorney, Agent, or Firm* — Harness, Dickey & Pierce, P.L.C.

(57) ABSTRACT

An image forming apparatus including an image reading unit to read an image of a document, disposed in an upper portion of the image forming apparatus; an image forming unit to form the image on a sheet, disposed below the image reading unit; at least upper and lower sheet roll supporters provided one above the other below the image forming unit to support a sheet roll, the lower sheet roll supporter offset proximally toward a front surface of the image forming apparatus from the upper sheet roll supporter; and multiple openings provided in the front surface of the image forming apparatus for the at least upper and lower sheet roll supporters through which the sheet roll is set to the at least upper and lower sheet roll supporters from a front surface side of the image forming apparatus.

19 Claims, 15 Drawing Sheets

(56) References Cited

U.S. PATENT DOCUMENTS

| | | | |
|---|---|---|---|
| 6,361,229 B1 | 3/2002 | Shinga | 400/613 |
| 6,431,492 B1 | 8/2002 | Chillscyzn | 242/577 |
| 8,011,611 B2 | 9/2011 | Yoshimaru et al. | 242/421 |
| 2007/0063086 A1* | 3/2007 | Itoh et al. | 242/348.4 |
| 2009/0103966 A1 | 4/2009 | Hoy | 400/619 |
| 2011/0063644 A1 | 3/2011 | Niihara et al. | 358/1.12 |

FOREIGN PATENT DOCUMENTS

| | | | | |
|---|---|---|---|---|
| JP | 04-86651 U | 7/1992 | | |
| JP | 06336062 A * | 12/1994 | | B41J 15/04 |
| JP | 07232497 A * | 9/1995 | | B43L 13/00 |
| JP | 08-091649 | 4/1996 | | |
| JP | 08-143192 A | 6/1996 | | |
| JP | 09240889 A * | 9/1997 | | B65H 16/02 |
| JP | 10-193740 | 7/1998 | | |
| JP | 10-198097 | 7/1998 | | |
| JP | 10-218437 | 8/1998 | | |
| JP | 11-116109 | 4/1999 | | |
| JP | 11-139632 | 5/1999 | | |
| JP | 2000-289896 | 10/2000 | | |
| JP | 2000-335028 | 12/2000 | | |
| JP | 2000335028 A * | 12/2000 | | B41J 11/66 |
| JP | 2003155149 A * | 5/2003 | | B65H 9/14 |
| JP | 3498626 | 12/2003 | | |
| JP | 2003341886 A * | 12/2003 | | B65H 16/06 |
| JP | 3590866 | 9/2004 | | |
| JP | 2005-239412 | 9/2005 | | |
| JP | 2005-335914 | 12/2005 | | |
| JP | 2008-120069 | 5/2008 | | |
| JP | 2009-078414 | 4/2009 | | |
| JP | 2009-130792 | 6/2009 | | |

OTHER PUBLICATIONS

Office Action for corresponding U.S. Appl. No. 12/923,270 dated Feb. 28, 2013.

Office Action for corresponding U.S. Appl. No. 12/923,270 dated Sep. 16, 2013.

English language abstract of Japan Patent Publication JP 10-218437, Aug. 1998.

English language abstract of Japan Patent Publication JP 2000-289896, Oct. 2000.

U.S. Office Action dated Feb. 6, 2014 for copending U.S. Appl. No. 12/923,270.

* cited by examiner

FRONT ←——X——→ BACK

FRONT ←——X——→ BACK

IMAGE FORMING APPARATUS WITH OFFSET UPPER AND LOWER SHEET ROLL SUPPORTERS

PRIORITY STATEMENT

The present patent application claims priority from Japanese Patent Application Nos. 2009-212438, filed on Sep. 14, 2009, and 2010-148019, filed on Jun. 29, 2010, both in the Japan Patent Office, each of which is hereby incorporated herein by reference in its entirety.

BACKGROUND

1. Technical Field

Illustrative embodiments described in this patent specification generally relate to an image forming apparatus, and more particularly to an image forming apparatus including an image reading unit, an image forming unit employing one or both of an inkjet recording system and an electrophotographic system, and at least upper and lower sheet roll supporters to support rolls of recording media sheets.

2. Description of the Related Art

An image forming apparatus is known that includes an image reading unit that reads an image of a document, an image forming unit that forms the image on a recording medium such as a sheet of paper, and at least upper and lower sheet roll supporters provided one above the other to respectively support sheet rolls constituted as one long continuous sheet wound around a core. The image reading unit, the image forming unit, and the upper and lower sheet roll supporters are provided, in that order, from the top to the bottom of the image forming apparatus, and each of the upper and lower sheet roll supporters supports the sheet roll such that the sheet is fed from the sheet roll. Examples of image forming apparatuses using the sheet roll to form images on the sheet fed from the sheet roll include large-scale copiers, printers, plotters, inkjet recording devices, and so forth, which are mainly used for drawing figures.

One example of the image reading unit included in the above-described image forming apparatus has a document conveyance path, a reading part, a circuit substrate that controls the reading part, and an upper structure openably closable to expose the document conveyance path. The upper structure is opened so that a user can handle the reading part and the circuit substrate independently from one side of the image forming apparatus. The image forming unit and a sheet feeder are further included in the image forming apparatus. More specifically, the image reading device, the image forming unit, and the sheet feeder are provided, in that order, from the top to the bottom of the image forming apparatus. The sheet feeder includes upper and lower pull-out-type sheet roll trays provided one above the other, which are pulled out from a main body of the image forming apparatus to set a sheet roll therein or to fix a sheet jam.

Another example of an image forming apparatus includes an image forming unit and a sheet feeder having upper and lower sheet roll supporters provided one above the other, in that order, from the top to the bottom of the image forming apparatus. The sheet feeder includes a sheet roll container for replacing a sheet roll, a sheet puller that unwinds the sheet roll contained in the sheet roll container, a cutter that cuts the sheet unwound by the sheet puller, a sheet conveyance unit to convey the sheet cut by the cutter to a predetermined conveyance path, and a pull-out-type housing including the sheet roll container, the sheet puller, the cutter, and the sheet conveyance unit. A concave sheet roll support member is provided in an upper portion of the housing so that the sheet roll can be temporarily placed on the sheet roll support member when the housing is pulled out from the image forming apparatus.

In yet another approach, a roll feeder detachably attachable to the image forming apparatus includes a supporter provided in a lower portion of the image forming apparatus to support a roll of a recording medium.

In an image forming apparatus in which the image reading unit is provided at the top thereof and the image forming unit and at least the upper and lower sheet roll supporters are provided below the image reading unit, in that order, from the top to the bottom of the image forming apparatus, it is preferable that a height of the image forming apparatus be, for example, not greater than 1,000 mm so that a user can easily access the image reading unit to set a document to be read thereupon.

The sheet feeder or the roll feeder is generally provided on a front side at the bottom of the image forming apparatus, so that a height of the image forming apparatus is reduced and the user can easily supply sheets or fix sheet jams from the front side of the image forming apparatus. Such a configuration is called a front operation system or a front loading system, and as a result, the user can easily operate an operation panel or a document stand provided on the front side at the top of the image forming apparatus, thereby providing the user-friendly configuration.

Multiple sheet rolls are often used and stored in these image forming apparatuses, which typically are very wide. In such an image forming apparatus, the sheet rolls are set one above the other in a vertical direction when the pull-out-type housing usually having a complex configuration is not provided in the image forming apparatus. Although depending on the type, width, and length of the sheet wound around the core, a weight of the sheet roll often exceeds 10 kg. Consequently, it is not easy to set such heavy sheet rolls one above the other in the image forming apparatus without the pull-out-type housing compared to loading the typically distributed stacks of sheets cut in a predetermined length. In addition, because a roll of glossy sheet is usually very costly, more care is needed to set the roll of glossy sheet to prevent damage thereto.

In an effort to overcome the above-described disadvantage, some image forming apparatuses, especially image forming apparatuses in which only one sheet roll is set, have a configuration in which the sheet roll supporter is provided in an upper portion of the image forming apparatuses. However, with the sheet rolls weighing in excess of 10 kg, it is difficult for users in general and female users in particular to lift such loads to the required chest-height level.

SUMMARY

In view of the foregoing, illustrative embodiments described herein provide an improved image forming apparatus including an image reading unit, an image forming unit, and at least upper and lower sheet roll supporters provided one above the other. Relative positions of the upper and lower sheet roll supporters, the image forming unit, and the image reading unit and a shape of an opening through which a sheet roll is set in the image forming apparatus are designed to facilitate setting of the sheet roll and a document to be read in the image forming apparatus with a simple configuration without a pull-out-type housing and the image forming apparatus is made more compact. Further, blots on and damage to the sheet roll upon setting of the sheet roll in the image forming apparatus are prevented.

At least one embodiment provides an image forming apparatus including: an image reading unit to read an image of a document, disposed in an upper portion of the image forming apparatus; an image forming unit to form the image on a sheet, disposed below the image reading unit; at least upper and lower sheet roll supporters provided one above the other below the image forming unit to support a sheet roll formed of a single long sheet wound around a core, to feed the sheet from the sheet roll, the lower sheet roll supporter offset proximally toward a front surface of the image forming apparatus from the upper sheet roll supporter; and multiple openings provided in the front surface of the image forming apparatus for the at least upper and lower sheet roll supporters through which the sheet roll is set to the at least upper and lower sheet roll supporters from a front surface side of the image forming apparatus.

Additional features and advantages of the illustrative embodiments will be more fully apparent from the following detailed description, the accompanying drawings, and the associated claims.

BRIEF DESCRIPTION OF THE DRAWINGS

A more complete appreciation of the illustrative embodiments described herein and the many attendant advantages thereof will be readily obtained as the same becomes better understood by reference to the following detailed description when considered in connection with the accompanying drawings, wherein.

Figure 1:
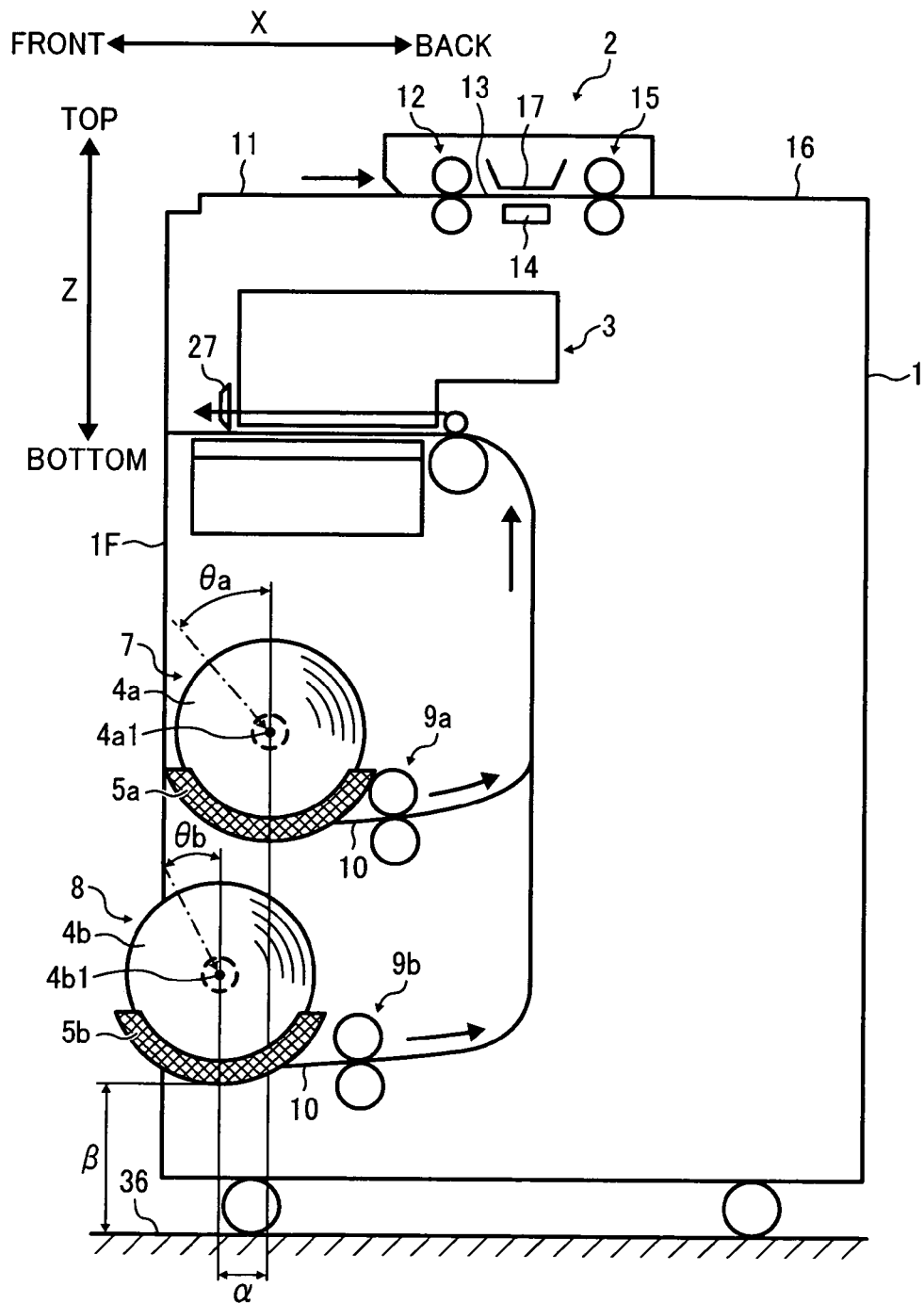
FIG. 1 is a vertical cross-sectional view illustrating an example of an overall configuration of an image forming apparatus according to a first illustrative embodiment.

The accompanying drawings are intended to depict illustrative embodiments and should not be interpreted to limit the scope thereof. The accompanying drawings are not to be considered as drawn to scale unless explicitly noted.

DETAILED DESCRIPTION OF ILLUSTRATIVE EMBODIMENTS

In describing illustrative embodiments illustrated in the drawings, specific terminology is employed for the sake of clarity. However, the disclosure of this specification is not intended to be limited to the specific terminology so selected, and it is to be understood that each specific element includes all technical equivalents that operate in a similar manner and achieve a similar result.

A description is now given of illustrative embodiments of the present invention with reference to drawings, wherein like reference numerals designate identical or corresponding parts throughout the several views.

The configuration and operation of an image forming apparatus 1 according to a first illustrative embodiment are described in detail below, with initial reference to FIG. 1 and FIG. 2.

FIG. 1 is a vertical cross-sectional view illustrating an example of an overall configuration of the image forming apparatus 1 according to the first illustrative embodiment. FIG. 2 is a perspective view illustrating the image forming apparatus 1 illustrated in FIG. 1. For ease of illustration, an image reading unit 2 is omitted from FIG. 2.

The image forming apparatus 1 includes the image reading unit 2, an image forming unit 3, and upper and lower flange receivers 5a and 5b, in that order, from the top to the bottom of the image forming apparatus 1. The image reading unit 2 reads an image of a document placed thereon, and the image forming unit 3 forms the image on a sheet 10 fed from an upper sheet roll 4a or a lower sheet roll 4b. Each of the upper and lower sheet rolls 4a and 4b is composed of a paper core and a single long sheet wound around the paper core. The upper and lower flange receivers 5a and 5b serve as a sheet roll supporter to support the upper and lower sheet rolls 4a and 4b, respectively, such that the sheet 10 is fed from each of the upper and lower sheet rolls 4a and 4b. The upper and lower flange receivers 5a and 5b are provided one above the other in a vertical direction, that is, a top and bottom direction Z of the image forming apparatus 1. It is to be noted that, for ease of illustration, the upper and lower flange receivers 5a and 5b are shown with a grid pattern in FIGS. 1, 7, 11A, 11B, and 13A to be described in detail later.

In FIG. 1, a horizontal direction perpendicular to the top and bottom direction Z is a front and back direction X of the image forming apparatus 1. Specifically, a front surface 1F of the image forming apparatus 1 is shown on the left in FIG. 1, and the back of the image forming apparatus 1 is shown on the right in FIG. 1. A direction perpendicular to the top and bottom direction Z and the front and back direction X, that is, a direction passing through the plane of FIG. 1, is a main scanning direction Y shown in FIG. 2. It is to be noted that the main scanning direction Y is a width direction of the sheet 10.

The image reading unit 2 includes a document stand 11 on which the document is set, a pair of document feed rollers 12 serving as a document conveyance unit to convey the document to an image reading position from the front to the back of the image forming apparatus 1, a contact image sensor 14 serving as an image reader provided at the image reading position to read an image of the document, a pair of document discharge rollers 15 serving as a document discharger to discharge the document after the image of the document is read, and a document discharge stand 16 to stack the document discharged by the pair of document discharge rollers 15.

The document set on the document stand 11 is conveyed sheet by sheet (if the document consists of multiple sheets) by the pair of document feed rollers 12 to a document conveyance path 13. An image of the document thus conveyed is read by the contact image sensor 14 provided at the image reading position within the document conveyance path 13. After the image is read by the contact image sensor 14, the document is discharged to the document discharge stand 16 by the pair of document discharge rollers 15.

The contact image sensor 14 extends over a substantial part of the width of the image forming apparatus 1, that is, in the main scanning direction Y, and includes a light source to direct light onto the document and an image sensor. Specifically, the light source of the contact image sensor 14 directs light onto the document conveyed through the document conveyance path 13 to focus the light reflected from the document on the image sensor through a lens array or the like. Thereafter, the light thus focused is photoelectrically converted into an image signal. The image reading unit 2 further includes a pressing plate 17 positioned opposite a contact glass, not shown, provided above the contact image sensor 14. The pressing plate 17 presses the document toward the contact image sensor 14, and serves also as a white reference plate.

The image forming unit 3 employs an inkjet recording system to form images. As illustrated in FIG. 2, the image forming apparatus 1 is a serial-type inkjet recording device.

The image forming unit 3 of the image forming apparatus 1 includes a guide rod 18 and a guide rail 19 each extended across right and left plates of the image forming apparatus 1, not shown. The guide rod 18 and the guide rail 19 slidably hold a carriage 20 movable in the main scanning direction Y. The carriage 20 includes liquid discharging heads, not shown, each discharging ink droplets of a specific color, that is, black (K), yellow (Y), magenta (M), or cyan (C). Each of the liquid discharging heads includes a sub-tank, not shown, integrally formed therewith to supply ink of the specified color to the liquid discharging heads.

Figure 2:
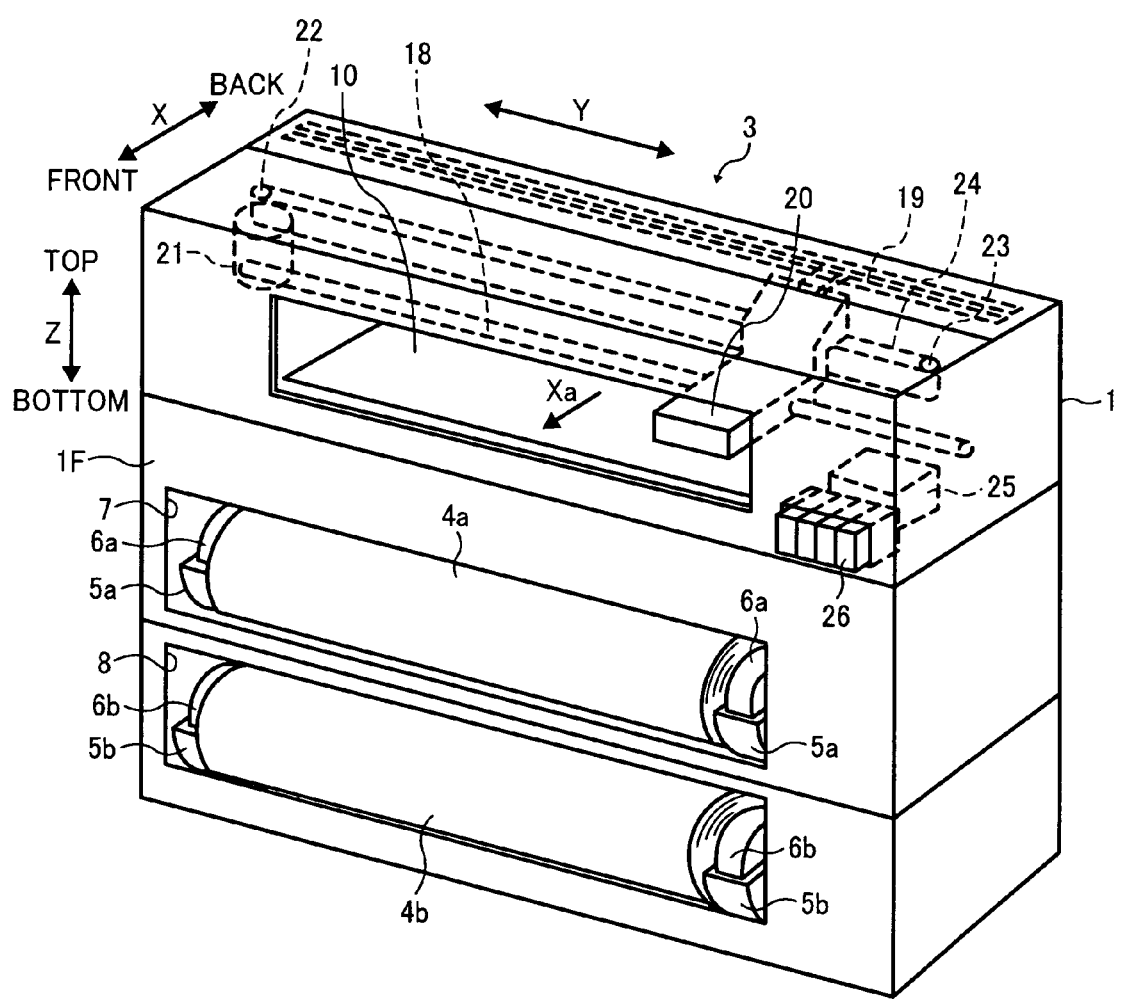
FIG. 2 is a perspective view illustrating the image forming apparatus illustrated in FIG. 1.

A main scanning mechanism that scans the carriage 20 in the main scanning direction Y includes: a drive motor 21 provided at one end of the image forming unit 3 in the main scanning direction Y, that is, the left in FIG. 2; a drive pulley 22 connected to an output shaft of the drive motor 21 to be rotatively driven by the drive motor 21; a driven pulley 23 provided at the other end of the image forming unit 3 in the main scanning direction Y, that is, the right in FIG. 2; and a belt member 24 wound around the drive pulley 22 and the driven pulley 23. A tension spring, not shown, applies tension to the driven pulley 23 outward, that is, in a direction away from the drive pulley 22. A part of the belt member 24 is fixed to a belt fixing part, not shown, provided on a back surface of the carriage 20 to pull the carriage 20 in the main scanning direction Y.

An encoder sheet, not shown, is provided along the main scanning direction Y of the carriage 20 to detect a main scanning position of the carriage 20. The encoder sheet is read by an encoder sensor, not shown, provided on the carriage 20. In an image recording range within a main scanning range of the carriage 20, the sheet 10 fed from the upper sheet roll 4a or the lower sheet roll 4b is intermittently conveyed in a sub-scanning direction Xa perpendicular to the main scanning direction Y or a direction of movement of the carriage 20, by a sheet conveyance mechanism, not shown.

The image forming unit 3 further includes a maintenance mechanism 25 that performs maintenance on the liquid discharging heads of the carriage 20 at one end of the main scanning range of the carriage 20, that is, the right in FIG. 2. Ink cartridges 26 each storing ink of the specified color to supply the ink to the sub-tank of each of the liquid discharging heads are detachably attached to the image forming apparatus 1.

Figure 9:
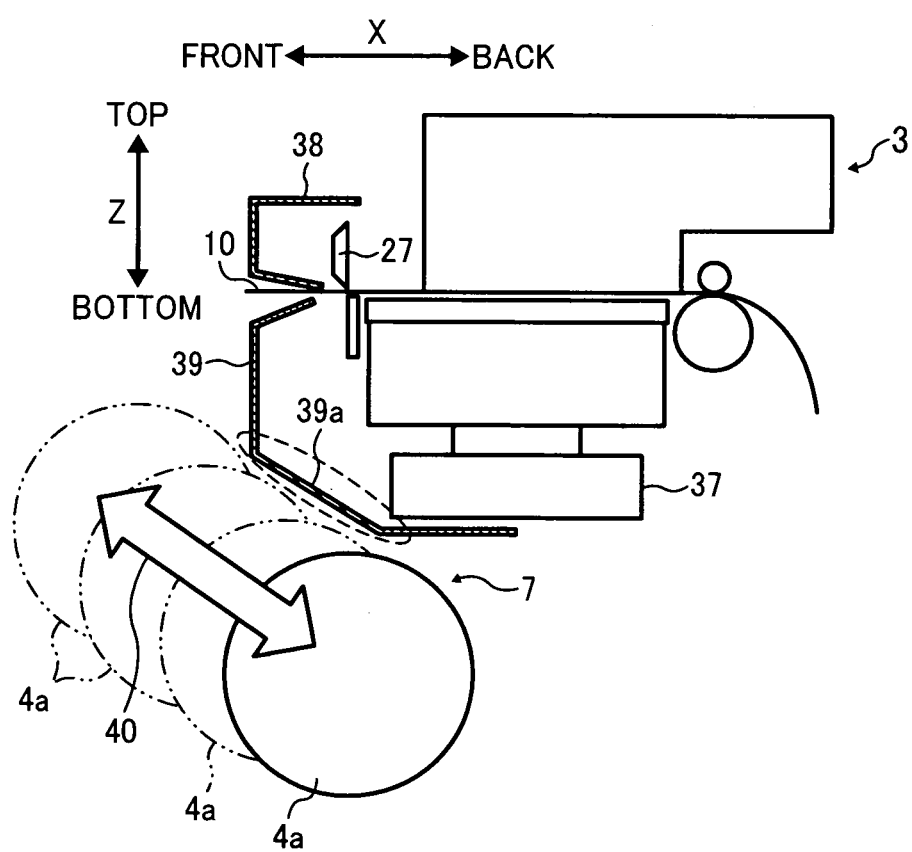
FIG. 9 is an enlarged vertical cross-sectional view illustrating the image forming apparatus illustrated in FIG. 8.
Figure 12:
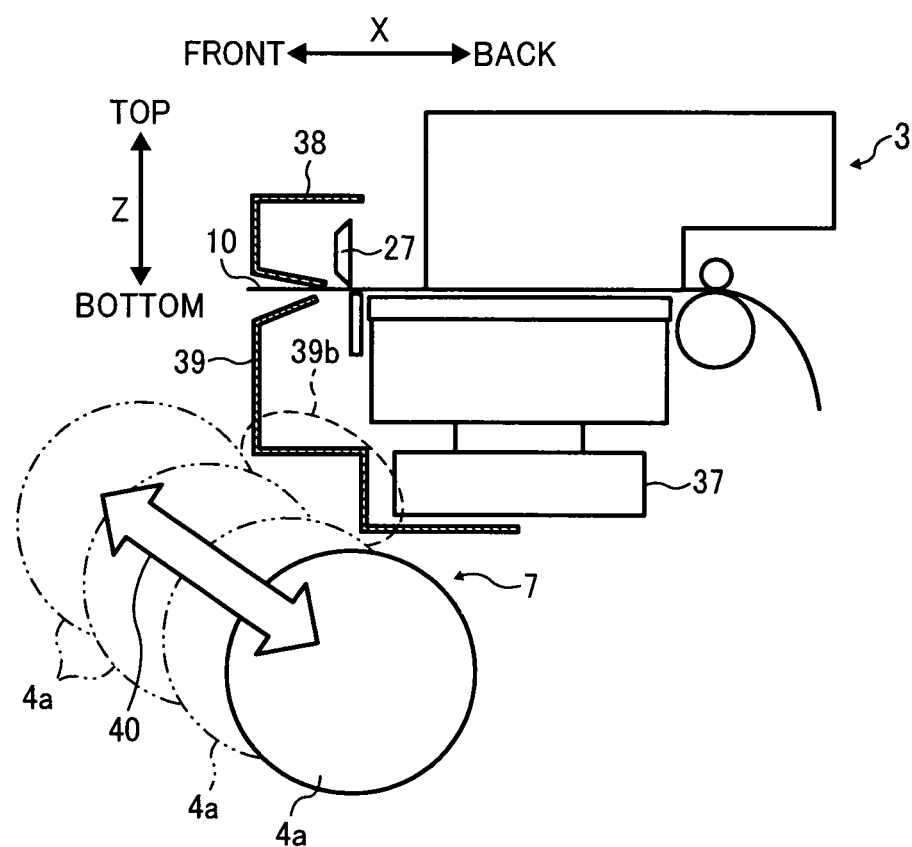
FIG. 12 is a vertical cross-sectional view illustrating a configuration of an image forming apparatus according to a first variation of the first illustrative embodiment.

Although not shown in FIGS. 1 and 2, discharge guide plates 38 and 39 are provided in front of an exit of the sheet 10 in the image forming unit 3 as illustrated in FIGS. 9 and 12 to be described in detail later. A cutter 27 that cuts the sheet 10 to a predetermined length is provided in front of the discharge guide plates 38 and 39 in the direction of conveyance of the sheet 10. It is to be noted that a well-known cutter may be used as the cutter 27. Specifically, the cutter 27 is fixed to a wire or a timing belt wound around multiple pulleys. The wire or the timing belt is moved in the main scanning direction Y by the drive motor 21 via one of the multiple pulleys connected to the drive motor 21 so that the sheet 10 is cut to the predetermined length by the cutter 27.

A description is now given of setting of the upper and lower sheet rolls 4a and 4b on the upper and lower flange receivers 5a and 5b, respectively.

The upper sheet roll 4a is set on the upper flange receivers 5a through upper flange members 6a, and the lower sheet roll 4b is set on the lower flange receivers 5b through lower flange members 6b. Sheet rolls of different types and different widths thereof can be set on the upper and lower flange receivers 5a and 5b, respectively. Specifically, each of the upper and lower flange receivers 5a and 5b are adjustable so as to be able to accommodate sheet rolls of various widths thereof including a large size such as A0 and A1. Examples of the types of the sheet rolls include glossy sheets, plain sheets, and so forth.

In general, the sheet roll is composed of a paper core made of cardboard or the like and a single long sheet of paper wound around the paper core. In the first illustrative embodiment, the maximum outer diameter of the upper and lower sheet rolls 4a and 4b is assumed to be, but is not limited to, about 200 mm.

On the front surface 1F of the image forming apparatus 1, generally rectangular upper and lower openings 7 and 8 are provided for the upper and lower flange receivers 5a and 5b, respectively. The upper and lower sheet rolls 4a and 4b are set from the front surface 1F through the upper and lower openings 7 and 8 to the upper and lower flange receivers 5a and 5b via the upper and lower flange members 6a and 6b, respectively. It is to be noted that, although the upper and lower openings 7 and 8 are provided on the front surface 1F of the image forming apparatus 1 according to the first illustrative embodiment, the number of openings is not limited to two. For example, more than two openings may be provided on the front surface 1F of the image forming apparatus 1 corresponding to the number of flange receivers.

Figure 3:
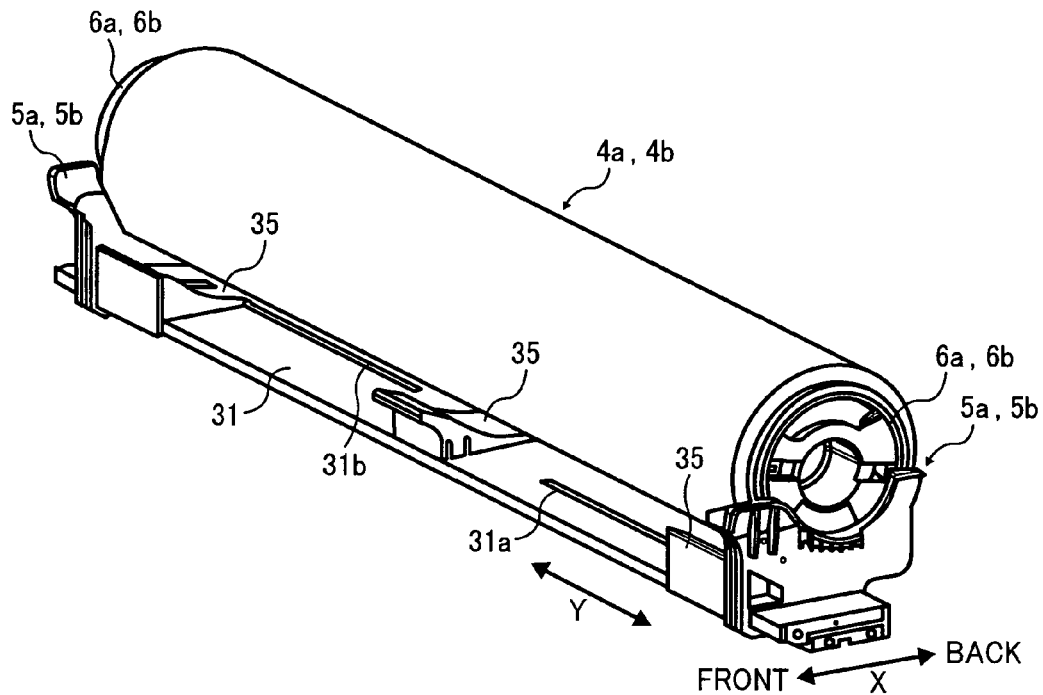
FIG. 3 is a perspective view illustrating one of upper and lower sheet rolls set on one of upper and lower flange receivers through one of upper and lower flange members.

FIG. 3 is a perspective view illustrating one of the upper and lower sheet rolls 4a and 4b set on one of the upper and lower flange receivers 5a and 5b through one of the upper and lower flange members 6a and 6b.

In order to set the upper sheet roll 4a in the image forming apparatus 1, first, the upper flange members 6a each serving as a guide member for the upper sheet roll 4a are inserted and fixed into both ends of the paper core of the upper sheet roll 4a. The upper flange members 6a thus fixed to the two ends of the paper core of the upper sheet roll 4a are then set downward on the upper flange receivers 5a, respectively, so that the upper sheet roll 4a is set on the upper flange receivers 5a through the upper flange members 6a. Similarly, in order to set the lower sheet roll 4b in the image forming apparatus 1, first, the lower flange members 6b each serving as a guide member for the lower sheet roll 4b are inserted and fixed into both ends of the paper core of the lower sheet roll 4b. The lower flange members 6b thus fixed to the two ends of the paper core of the lower sheet roll 4b are then set downward on the lower flange receivers 5b, respectively, so that the lower sheet roll 4b is set on the lower flange receivers 5b through the lower flange members 6b.

Specifically, the upper flange members 6a are fixed coaxially to the two ends of the paper core of the upper sheet roll 4a along the axis of the paper core, and the lower flange members 6b are fixed coaxially to the two ends of the paper core of the lower sheet roll 4b along the axis of the paper core. An outer diameter of each of the upper and lower flange members 6a and 6b is smaller than the maximum outer diameter of each of the upper and lower sheet rolls 4a and 4b. In FIG. 3, reference numeral 31 denotes a receiver stay that holds the upper or lower flange receivers 5a or 5b provided at the two ends of the upper or lower sheet roll 4a or 4b in place in the main scanning direction Y.

Figure 4:
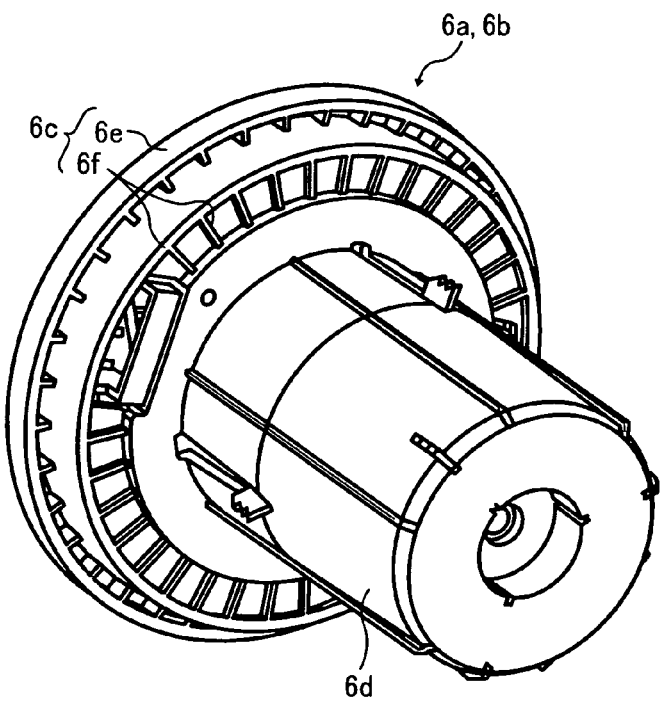
FIG. 4 is an enlarged perspective view illustrating a configuration of one of the upper and lower flange members.

A description is now given of an example of a flange system, which is one type of sheet roll feed systems, with reference to FIG. 4. FIG. 4 is an enlarged perspective view illustrating a configuration of one of the upper and lower flange members 6a and 6b. Each of the upper and lower flange members 6a and 6b includes a large disk 6c that contacts one end of the upper or lower sheet roll 4a or 4b and a small cylinder 6d inserted into the paper core of the upper or lower sheet roll 4a or 4b. In the example shown in FIG. 4, the only difference between the upper flange member 6a for the upper sheet roll 4a and the lower flange member 6b for the lower sheet roll 4b is an outer diameter of the small cylinder 6d inserted into the paper core of the upper or lower sheet roll 4a or 4b having an inner diameter of, for example, 2 inches or 3 inches. Therefore, a configuration of the upper flange member 6a for the upper sheet roll 4a is described in detail below as representative with reference to FIG. 4. It is to be noted that the configuration of the upper and lower flange members 6a and 6b is not limited to the example with the difference described above. Alternatively, for example, the outer diameter of the small cylinder 6d of the lower flange member 6b may be the same as that of the small cylinder 6d of the upper flange member 6a.

Figure 5:
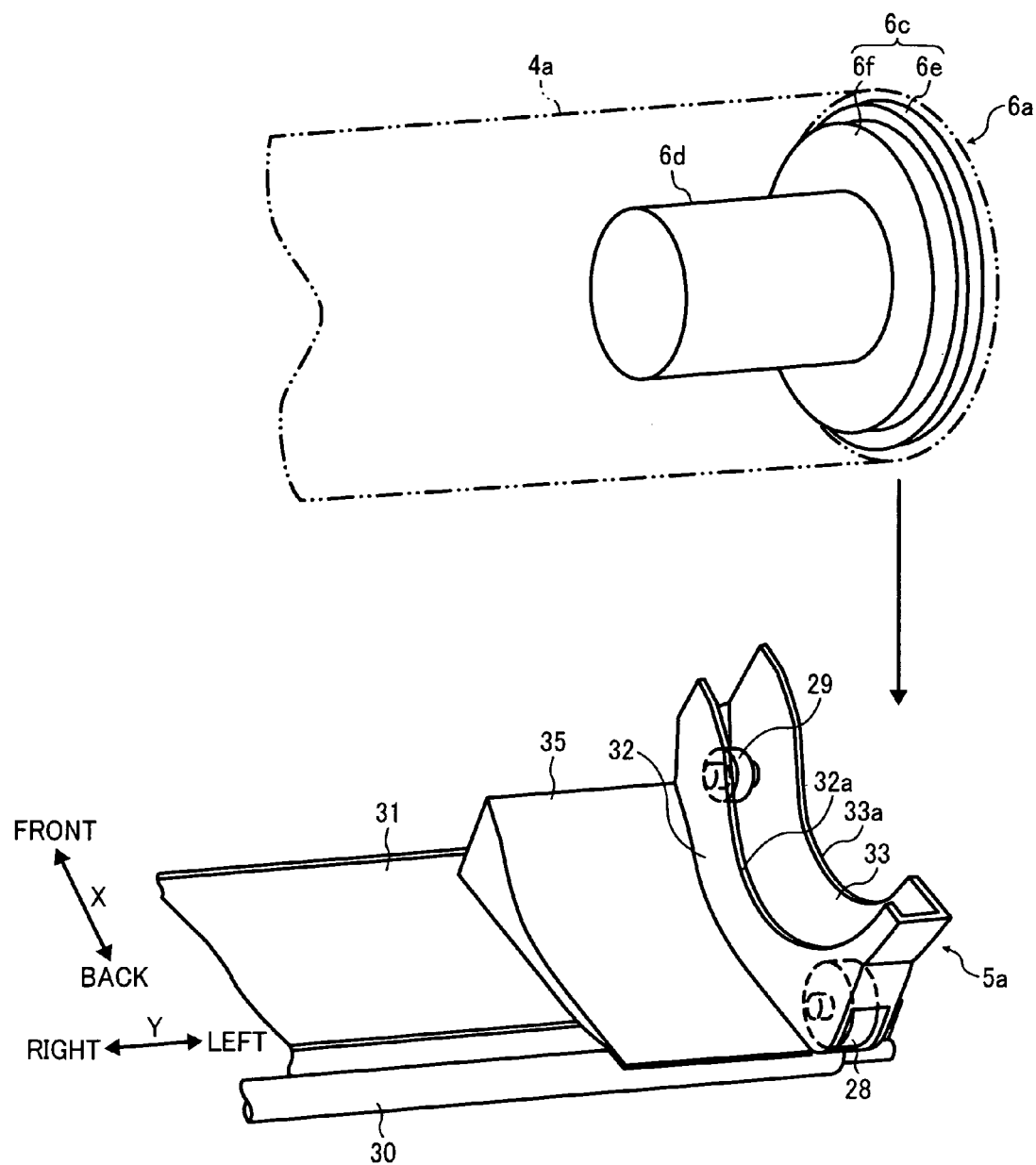
FIG. 5 is a perspective view illustrating relative positions of the upper flange member and the upper flange receiver.

The large disk 6c of the upper flange member 6a includes a contact part 6e that contacts a relay roller 28 and a support roller 29 to be rotatably supported, and a hit part 6f that hits on one end of the upper sheet roll 4a. The relay roller 28 and the support roller 29 each illustrated in FIG. 5 are described in detail later.

A well-known configuration may be used to fix the upper flange member 6a to the upper sheet roll 4a. For example, a lever may be provided to the large disk 6c of the upper flange member 6a. The lever is operated by a user so that a pick protrudes from the small cylinder 6d and digs into the paper core of the upper sheet roll 4a to fix the upper flange member 6a to the upper sheet roll 4a. Alternatively, the small cylinder 6d may have a tapered portion to be inserted into the paper core of the upper sheet roll 4a so that the tapered portion of the small cylinder 6d digs into the paper core of the upper sheet roll 4a and is fixed to the upper sheet roll 4a.

Sheet roll feed systems are broadly divided into the flange system described above and a spool system, each of which has its advantages and disadvantages. Although lightness in weight of the flange member improves operability, friction to the flange member is used for transmission of torque in the flange system, complicating a drive mechanism compared to the spool system. On the other hand, in the spool system, for example, a metal spool formed of aluminum or the like or a long shaft called a mandrill shaft is inserted into the paper core of the sheet roll to be fixed to the sheet roll, degrading operability in a small space. However, because the heavy sheet roll can be supported at only one point, that is, at the center in a longitudinal direction thereof, in the spool system, inertia upon startup and stopping of operations can be reduced compared to the flange system in which the outer diameter of the flange member is supported at least at two points in a longitudinal direction thereof. Further, the receiver stay provided below the sheet roll in the flange system is not needed in the spool system.

In the first illustrative embodiment, the flange system is employed in order to facilitate setting of the sheet roll and to prevent blot and damage to the sheet roll upon setting of the sheet roll. Alternatively, the spool system to be described in detail later in a second illustrative embodiment may be employed in place of the flange system in the first illustrative embodiment.

Figure 6:
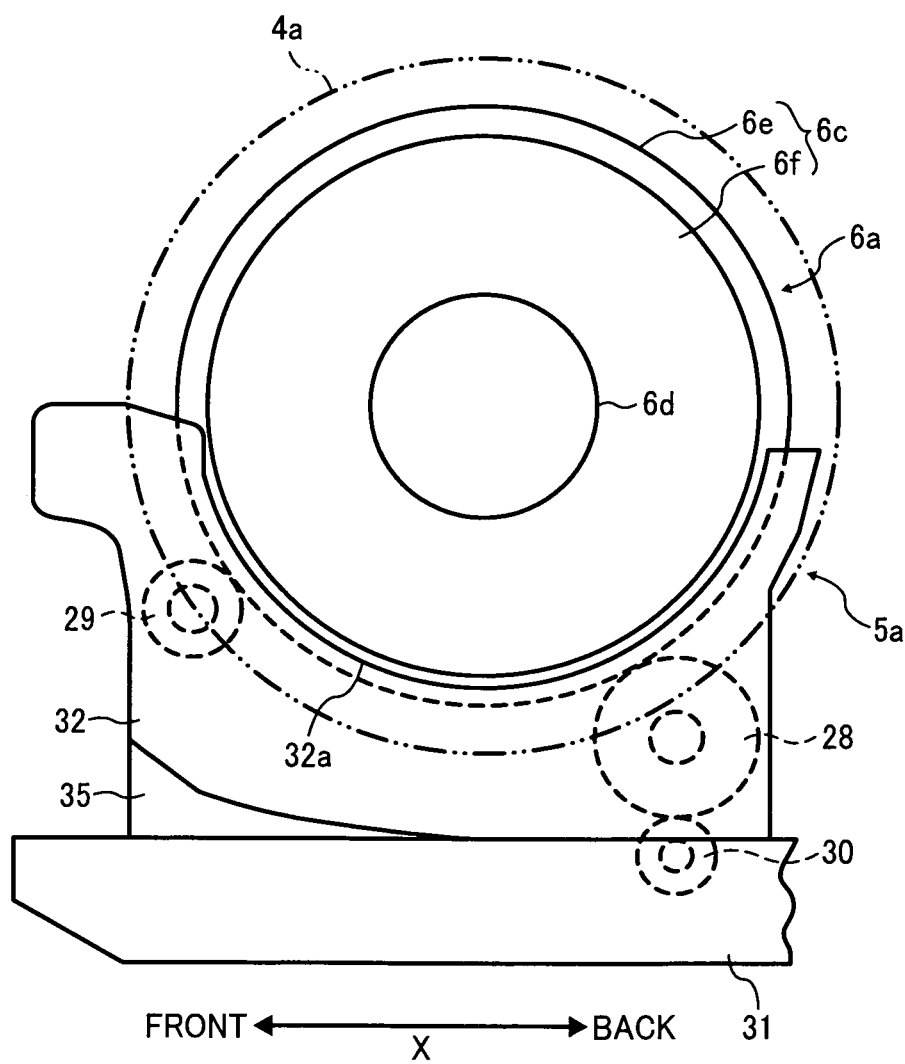
FIG. 6 is a vertical cross-sectional view illustrating a state in which the upper flange member attached to one end of the upper sheet roll is set on the upper flange receiver viewed from the main scanning direction in FIG. 5.

A description is now given of the upper and lower flange members 6a and 6b and the upper and lower flange receivers 5a and 5b with reference to FIGS. 5 and 6. FIG. 5 is a perspective view illustrating relative positions of the upper flange member 6a and the upper flange receiver 5a respectively provided to the left of the image forming apparatus 1 when viewed from the front. FIG. 6 is a vertical cross-sectional view illustrating a state in which the upper flange member 6a fixed to one end of the upper sheet roll 4a is set on the upper flange receiver 5a viewed from the main scanning direction Y in FIG. 5. In FIGS. 5 and 6, the upper sheet roll 4a is indicated by broken lines for ease of illustration.

It is to be noted that the only difference between the configurations for respectively setting the upper and lower flange members 6a and 6b fixed to the upper and lower sheet rolls 4a and 4b on the upper and lower flange receivers 5a and 5b is a shape of the receiver stay 31. Therefore, setting of the upper flange member 6a fixed to one end of the upper sheet roll 4a on the upper flange receiver 5a is described in detail below as representative, with reference to FIGS. 5 and 6.

The upper flange receivers 5a provided at the two ends of the upper sheet roll 4a are slidably attached to the receiver stay 31 extended in the main scanning direction Y. More specifically, as illustrated in FIG. 3, the upper flange receivers 5a slide using a rack and pinion mechanism, not shown, in the main scanning direction Y along guide grooves 31a and 31b respectively provided parallel to the main scanning direction Y to the receiver stay 31. The rack and pinion mechanism is provided on a back surface of the receiver stay 31, and also locks the upper flange receivers 5a at certain positions.

The upper flange receivers 5a are respectively provided at two positions on the receiver stay 31 corresponding to the two ends of the upper sheet roll 4a rotatably supported so that the sheet 10 is fed from the upper sheet roll 4a. The relay roller 28 and the support roller 29 are provided in the same virtual plane perpendicular to a rotary shaft of the sheet roll thus supported, that is, the upper sheet roll 4a in FIGS. 5 and 6. A rewind roller 30 extends over a substantial part of the width of the image forming apparatus 1, that is, in the main scanning direction Y to contact the relay rollers 28 respectively provided to the upper flange receivers 5a positioned at the two ends of the upper sheet roll 4a.

As illustrated in FIG. 5, the upper flange receiver 5a includes an inner wall 32 provided on the inside in the direction of the rotary shaft of the upper sheet roll 4a and an outer wall 33 provided opposite the inner wall 32, that is, the outside in the direction of the rotary shaft of the upper sheet roll 4a. The inner wall 32 and the outer wall 33 are integrally formed with the upper flange receiver 5a, and have semi-circular cutouts 32a and 33a, respectively, corresponding to a shape of the contact part 6e integrally formed with the upper flange member 6a.

As illustrated in FIG. 6, the contact part 6e of the upper flange member 6a contacts the relay roller 28 and the support roller 29 to be rotatably supported. A tapered portion 35 is provided adjacent to the upper flange receiver 5a on the inside in the direction of the rotary shaft of the upper sheet roll 4a to guide the sheet 10 fed from the upper sheet roll 4a set on the upper flange receiver 5a.

As is clear from the above descriptions, the two upper flange receivers 5a having the above-described configuration are provided corresponding to the upper flange members 6a provided at the two ends of the upper sheet roll 4a, respectively. More specifically, the two upper flange receivers 5a are symmetrically provided relative to a virtual plane perpendicular to the rotary shaft of the upper sheet roll 4a passing through the center of the rotary shaft of the upper sheet roll 4a in a longitudinal direction thereof. In other words, a pair of right and left upper flange receivers 5a is provided.

The upper flange member 6a fixed to one end of the upper sheet roll 4a set on the upper flange receiver 5a is rotatably supported by the relay roller 28 and the support roller 29 of the upper flange receiver 5a. Further, the upper flange member 6a is locked by the inner and outer walls 32 and 33 of the upper flange receiver 5a such that the upper sheet roll 4a to which the upper flange member 6a is fixed is not moved in the direction of the rotary shaft of the upper sheet roll 4a, that is, the main scanning direction Y.

As described previously, the rewind roller 30 extends over a substantial part of the width of the image forming apparatus 1, that is, in the main scanning direction Y to contact the relay rollers 28 provided to the two upper flange receivers 5a respectively positioned at the two ends of the upper sheet roll 4a. The rewind roller 30 is driven by a drive unit, not shown, to rewind the sheet 10 to the upper sheet roll 4a. The sheet 10 is rewound to the upper sheet roll 4a by the rewind roller 30 to remove slack upon feeding or sending of the sheet 10 from the upper sheet roll 4a or to control positions to feed the sheet 10 from the upper sheet roll 4a. Specifically, a drive force is transmitted from the drive unit to the rewind roller 30 to reversely rotate the upper flange member 6a using frictional contact between the rewind roller 30 and the relay roller 28, and the relay roller 28 and the upper flange member 6a. In other words, the relay roller 28 transmits the drive force from the rewind roller 30 to the upper flange member 6a.

A one-way clutch, not shown, serving as a clutch mechanism is provided to a shaft of the rewind roller 30. The one-way clutch transmits the drive force to the rewind roller 30 from the drive unit to rewind the sheet 10 to the upper sheet roll 4a, and blocks transmission of the drive force to the rewind roller 30 to send the sheet 10 from the upper sheet roll 4a.

The drive unit includes, for example, a motor or the like, and applies the drive force to a pair of upper or lower sheet feed rollers 9a or 9b to feed the sheet 10 from the upper or lower sheet roll 4a or 4b in a forward direction. Further, the drive unit applies the drive force to the rewind roller 30 to rewind the sheet 10 to the upper or lower sheet roll 4a or 4b.

As described above, the upper flange members 6a are rotated by the relay rollers 28 and the support rollers 29 to feed the sheet 10 from the upper sheet roll 4a when the upper sheet roll 4a is set on the upper flange receivers 5a through the upper flange members 6a. At this time, the rotary shaft of the upper sheet roll 4a is automatically centered. Similarly, the rotary shaft of the lower sheet roll 4b is automatically centered when the lower sheet roll 4b is set on the lower flange receivers 5b through the lower flange members 6b.

In the first illustrative embodiment, the upper and lower sheet rolls 4a and 4b each having a different width and a paper core with a different inner diameter are used, and therefore the upper and lower flange members 6a and 6b each having a different size and the upper and lower flange receivers 5a and 5b each having a different size are used. With regard to the sheet rolls, in addition to various types of paper, the paper core of the sheet roll may have various diameters including generally used sizes such as 2 inches and 3 inches. Although the positions and the number of the support rollers 29 may be changed to handle the various types of the sheet rolls, descriptions thereof are omitted herein.

Operation of the image forming apparatus 1 having the above-described configuration is described in detail below, again with reference to FIGS. 1 and 2. As described previously, the upper and lower sheet rolls 4a and 4b are set on the upper and lower flange receivers 5a and 5b through the upper and lower flange members 6a and 6b, respectively. A leading edge of the sheet 10 is set to be fed from each of the upper and lower sheet rolls 4a and 4b by the pairs of upper and lower sheet feed rollers 9a and 9b, respectively.

The user places the document, not shown, on the document stand 11 of the image reading unit 2 and operates keys on an operation unit, not shown, provided near the image reading unit 2 so that certain image forming conditions are set. Specifically, selection of the upper or lower sheet roll 4a or 4b and a full-color mode or a monochrome mode, the number of sheets to form images, and so forth, are set as the image forming conditions. A signal including such image forming conditions is input to a control unit, not shown, to drive the image forming apparatus 1 so that the image reading unit 2 reads an image of the document, and the contact image sensor 14 outputs an image signal to form the image.

When the upper sheet roll 4a is selected by the user through the operating keys, the pair of upper sheet rollers 9a is rotated by the drive force transmitted from the motor and the upper flange members 6a set on the upper flange receivers 5a are rotated to feed the sheet 10 from the upper sheet roll 4a. The sheet 10 fed by the pair of sheet feed rollers 9a is conveyed through a sheet conveyance path from the back to the front of the image forming apparatus 1 by a conveyance unit such as a conveyance roller, not shown, to an inkjet recording range in the image forming unit 3. In the image forming unit 3, the carriage 20 is moved in the main scanning direction Y and drives the liquid discharging heads to discharge liquid droplets based on image data while the sheet 10 is intermittently conveyed in the sub-scanning direction Xa to form the image on the sheet 10. The sheet 10 having the image thereon is then conveyed to the cutter 27 provided in front of the upper and lower discharge guide plates 38 and 39 in the direction of conveyance of the sheet 10 so that the sheet 10 is cut in a predetermined length by the cutter 27 moving in the main scanning direction Y. Thereafter, the sheet 10 is discharged to a discharge tray, not shown, provided to the front of the image forming apparatus 1.

The image data is not limited to the image of the document read by the image reading unit 2. Alternatively, the image data may be sent from a personal computer or the like communicably connected to the image forming apparatus 1.

As described above, the upper and lower sheet rolls 4a and 4b are set on the upper and lower flange receivers 5a and 5b through the upper and lower flange members 6a and 6b, respectively. The upper and lower sheet rolls 4a and 4b are set at the bottom on the front surface 1F side of the image forming apparatus 1. The front surface 1F of the image forming apparatus 1 has the upper and lower openings 7 and 8 through which the upper and lower sheet rolls 4a and 4b are set, respectively.

In the first illustrative embodiment, the centers 4a1 and 4b1 of the vertical cross-sections of the upper and lower sheet rolls 4a and 4b respectively set on the upper and lower flange receivers 5a and 5b are offset in the front and back direction X of the image forming apparatus 1. Specifically, the center 4b1 of the lower sheet roll 4b is offset by α mm to the front of the image forming apparatus 1 from the center 4a1 of the upper sheet roll 4a, so that the center 4b1 of the lower sheet roll 4b is positioned closer to the front surface 1F of the image forming apparatus 1 than the center 4a1 of the upper sheet roll 4a.

In other words, the upper and lower flange receivers 5a and 5b on which the upper and lower sheet rolls 4a and 4b are respectively set are offset in the front and back direction X of the image forming apparatus 1. Similarly, the center of a vertical cross-section of the receiver stay 31 that supports the lower flange receivers 5b is offset by α mm to the front of the image forming apparatus 1 from the center of a vertical cross-section of the receiver stay 31 that supports the upper flange receivers 5a.

It is to be noted that the center 4a1 of the upper sheet roll 4a means the same as the center of rotation of each of the upper flange members 6a when the upper sheet roll 4a is set on the upper flange receivers 5a through the upper flange members 6a. Similarly, the center 4b1 of the lower sheet roll 4b means the same as the center of rotation of each of the lower flange members 6b when the lower sheet roll 4b is set on the lower flange receivers 5b through the lower flange members 6b.

The offset amount α mm is determined taking into consideration the effects achieved by the first illustrative embodiment, that is, facilitation of setting of the upper and lower sheet rolls 4a and 4b on the upper and lower flange receivers 5a and 5b and reduction of a height of the image forming apparatus 1 to 1,000 mm, and the maximum outer diameters of the upper and lower sheet rolls 4a and 4b.

In the first illustrative embodiment, the lower flange receivers 5b are positioned closer to a floor 36 on which the image forming apparatus 1 is installed. It is preferable that a distance β mm between the lowest surface of each of the lower flange receivers 5b and the floor 36 be set to not less than 100 mm in order to facilitate setting of the lower sheet roll 4b on the lower flange receivers 5b.

Further, in the first illustrative embodiment, an angle θb of loading of the lower sheet roll 4b into the lower flange receivers 5b through the lower opening 8 is more acute relative to a virtual vertical line than an angle θa of loading of the upper sheet roll 4a into the upper flange receivers 5a through the upper opening 7 (θb<θa) in order to facilitate setting of the upper and lower sheet rolls 4a and 4b on the upper and lower flange receivers 5a and 5b, respectively.

The above-described configuration and operation of the image forming apparatus 1 is simple and facilitates replacement of the upper and lower sheet rolls 4a and 4b without a costly and complex layout such as the related-art pull-out-type configuration using a large number of components. Further, a distance between the upper and lower sheet rolls 4a and 4b respectively set on the upper and lower flange receivers 5a and 5b can be reduced, thereby making the image forming apparatus 1 more compact. Accordingly, a height of the image forming apparatus 1 can also be reduced so that the user can more easily access the document stand 11 provided at the top of the image forming apparatus 1 to place the document to be read on the document stand 11. Further, blot and damage to the upper and lower sheet rolls 4a and 4b caused by inadvertently contacting the image forming apparatus 1 upon setting of the upper and lower sheet rolls 4a and 4b can be prevented.

The lower flange receivers 5b are positioned closer to the floor 36 as described above so that the user can easily set even the heavy lower sheet roll 4b on the lower flange receivers 5b in a comfortable position, thereby reducing loads on the user. Further, the angle θb of loading of the lower sheet roll 4b into the lower flange receivers 5b is more acute than the angle θa of loading of the upper sheet roll 4a into the upper flange receivers 5a so that the user can more easily set the upper and lower sheet rolls 4a and 4b on the upper and lower flange receivers 5a and 5b, respectively, in a comfortable position.

Figure 7:
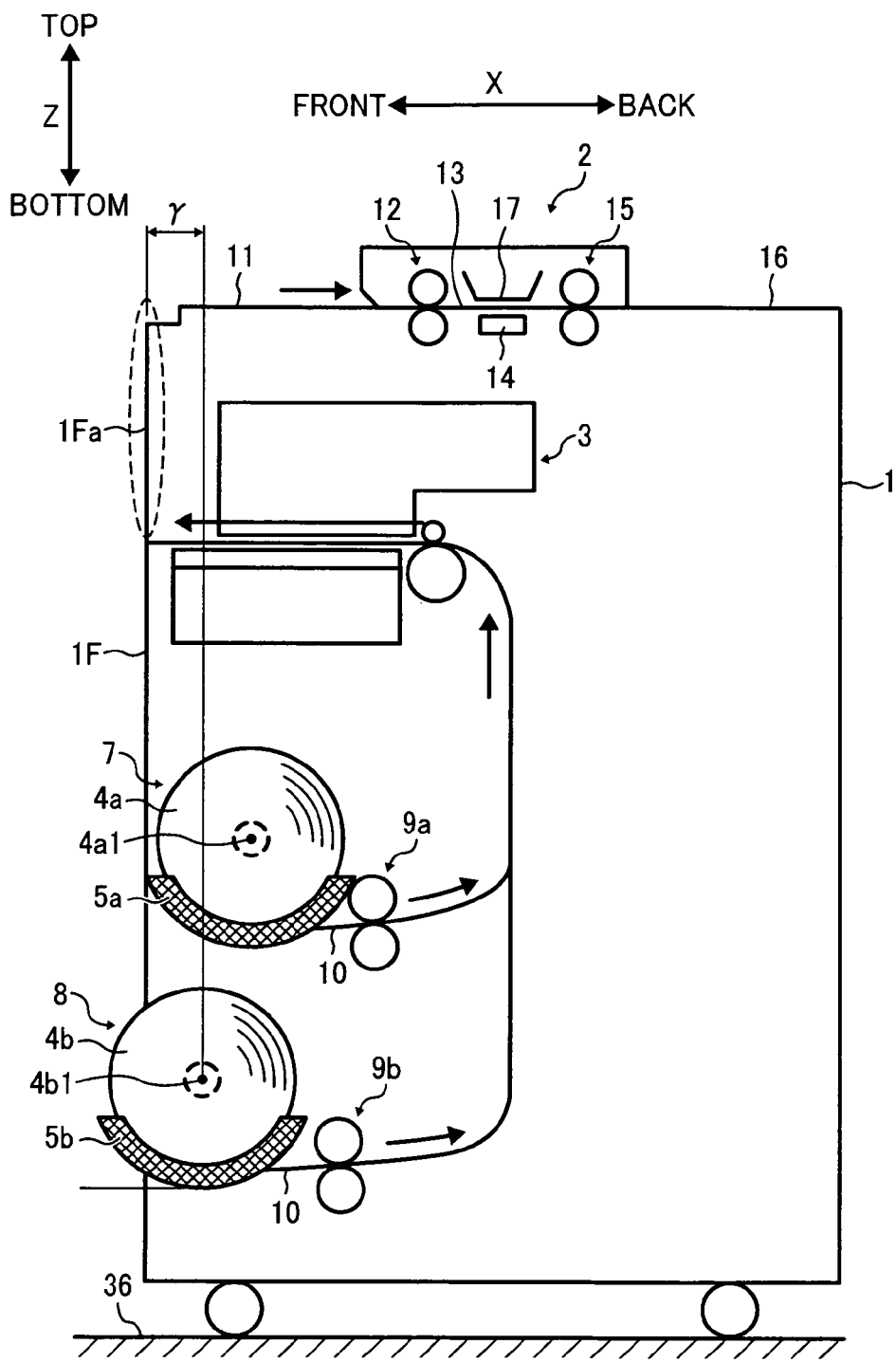
FIG. 7 is a vertical cross-sectional view illustrating another feature of the image forming apparatus according to the first illustrative embodiment.

FIG. 7 is a vertical cross-sectional view illustrating another feature of the image forming apparatus 1 according to the first illustrative embodiment.

As illustrated in FIG. 7, the lower flange receivers 5b are provided at the bottom of the image forming apparatus 1 such that the center 4b1 of the lower sheet roll 4b set on the lower flange receivers 5b is positioned to the back of a front edge 1Fa of the front surface 1F of the image forming apparatus 1 indicated by a dotted oval in FIG. 7. Specifically, the front edge 1Fa of the front surface 1F of the image forming apparatus 1 positioned above the upper sheet roll 4a set on the upper flange receivers 5a is offset by γ mm to the front from the center 4b1 of the lower sheet roll 4b set on the lower flange receivers 5b. This arrangement has the advantage of facilitating setting of the upper and lower sheet rolls 4a and 4b on the upper and lower flange receivers 5a and 5b, respectively.

The offset amount γ mm is decided taking into consideration the effects achieved by the first illustrative embodiment, that is, facilitation of setting of the upper and lower sheet rolls 4a and 4b on the upper and lower flange receivers 5a and 5b and reduction of a height of the image forming apparatus 1 to 1,000 mm, and the maximum outer diameters of the upper and lower sheet rolls 4a and 4b.

Figure 8:
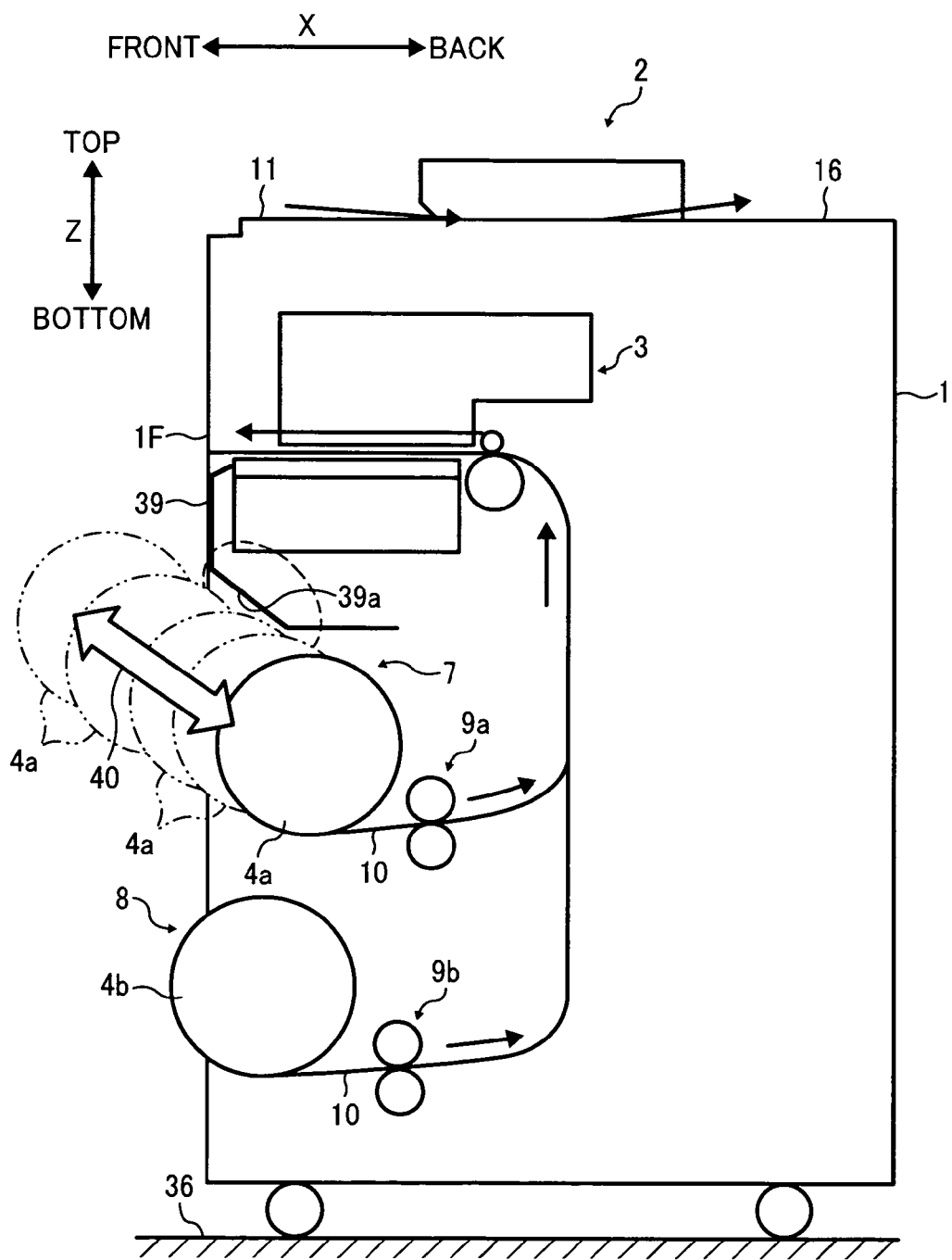
FIG. 8 is a vertical cross-sectional view illustrating yet another feature of the image forming apparatus according to the first illustrative embodiment.

FIG. 8 is a vertical cross-sectional view illustrating yet another feature of the image forming apparatus 1 according to the first illustrative embodiment. FIG. 9 is an enlarged vertical cross-sectional view of the image forming apparatus 1 illustrated in FIG. 8. In the image forming apparatus 1 illustrated in FIGS. 8 and 9, an upper edge of the upper opening 7 for the upper flange receivers 5a is chamfered, that is, formed as a sloped portion 39a tilting downward from the front surface 1F to the back of the image forming apparatus 1.

The upper and lower discharge guide plates 38 and 39 guide the sheet 10 having the image thereon cut to a predetermined length by the cutter 27 to the discharge tray, not shown, provided to the front of the image forming apparatus 1. For example, the upper and lower discharge guide plates 38 and 39 are formed by processing sheet metal. Reference numeral 37 denotes a suction fan that sucks a back surface of the sheet 10 when the image forming unit 3 forms the image on the sheet 10 using the inkjet recording system.

As illustrated in FIGS. 8 and 9, the lower discharge guide plate 39 is positioned at the upper edge of the upper opening 7 to enclose a front surface of the suction fan 37. The lower discharge guide plate 39 has the sloped portion 39a circled by a dotted line in FIGS. 8 and 9. The sloped portion 39a is tilted downward from the front surface 1F to the suction fan 37 toward the back of the image forming apparatus 1.

The sloped portion 39a must be formed throughout a range through which the upper sheet roll 4a passes upon being set on the upper flange receivers 5a through the upper opening 7. Specifically, the sloped portion 39a must be provided not only at both ends of the upper edge of the upper opening 7 for the two ends of the upper sheet roll 4a held by the user upon setting of the upper sheet roll 4a on the upper flange receivers 5a, but also throughout the upper edge of the upper opening 7 to handle the maximum outer diameter of the upper sheet roll 4a larger than the upper flange members 6a.

It is preferable that provision of the sloped portion 39a or a right-angle cutout 39b, to be described in detail later with reference to FIG. 12, to the lower discharge guide plate 39 be decided taking into consideration both design and processability. For example, although the effects achieved by the sloped portion 39a and the right-angle cutout 39b are the same, because a component having a sloped portion formed by press working tends to have lower processability, it is preferable that the sloped portion be machined. Further, it is preferable that a size of the sloped portion 39a or the right-angle cutout 39b be decided taking into consideration arrangement of surrounding components and the strength of components to be recessed.

Specifically, the sloped portion 39a or the right-angle cutout 39b is provided along a direction 40 of attachment and detachment of the upper sheet roll 4a indicated by a thick double-headed arrow in FIGS. 8 and 9, such that the upper sheet roll 4a having the assumed maximum outer diameter is set on the upper flange receivers 5a without contacting the surrounding components.

Figure 10:
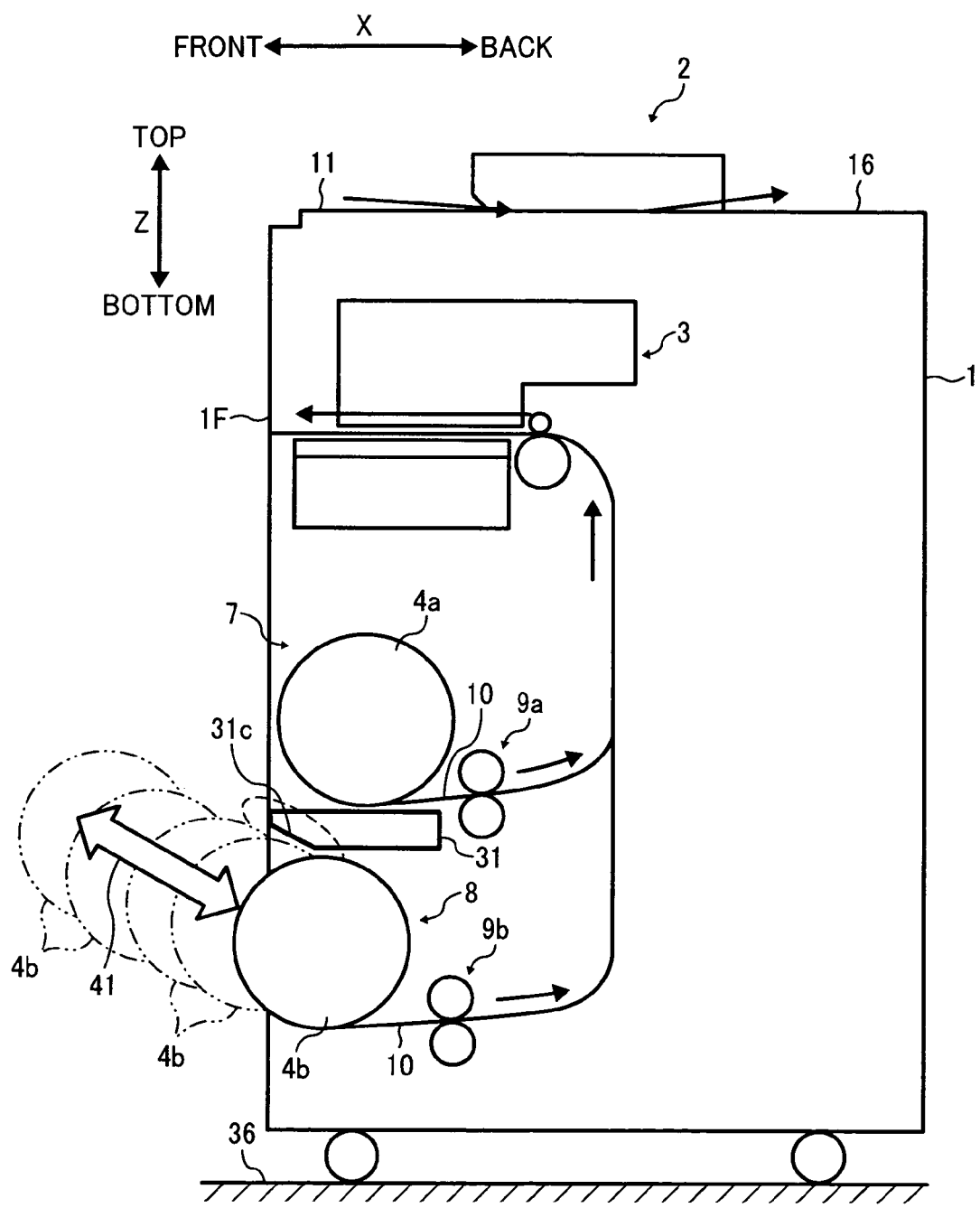
FIG. 10 is a vertical cross-sectional view illustrating still yet another feature of the image forming apparatus according to the first illustrative embodiment.
Figure 11A:
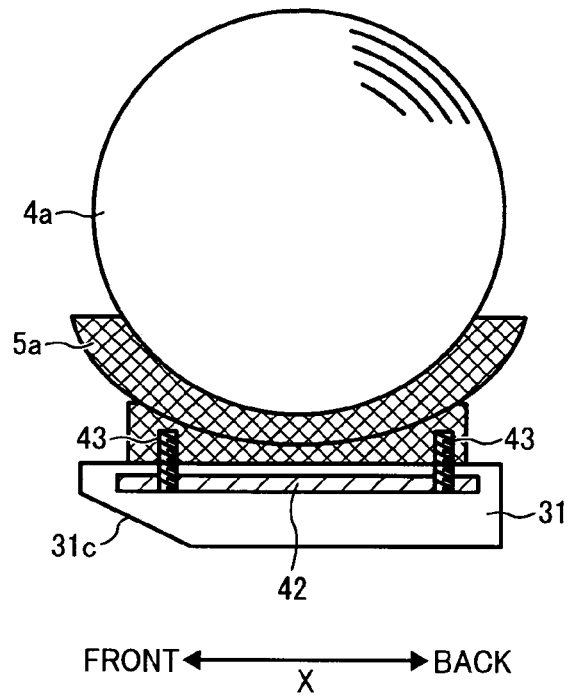
FIG. 11A is a vertical cross-sectional view illustrating engagement of the upper flange receiver and a receiver stay according to the first illustrative embodiment.

FIG. 10 is a vertical cross-sectional view illustrating still yet another feature of the image forming apparatus 1 according to the first illustrative embodiment. FIG. 11A is a vertical cross-sectional view illustrating engagement of the upper flange receiver 5a and the receiver stay 31 illustrated in FIG. 10.

As illustrated in FIGS. 10 and 11A, an upper edge of the lower opening 8 for the lower flange receivers 5b is chamfered, that is, formed as a sloped portion 31c tilting downward from the front surface 1F toward the back of the image forming apparatus 1.

The receiver stay 31 that supports the upper flange receivers 5a (hereinafter also referred to as the upper receiver stay 31) is provided to form the upper edge of the lower opening 8 for the lower flange receivers 5b. The upper receiver stay 31 serves as a support member to support the upper flange receivers 5a on which the upper sheet roll 4a is set thorough the upper flange members 6a. The upper receiver stay 31 also serves as a reinforcement member, and is formed of, for example, sheet metal.

The upper receiver tray 31 positioned above the lower sheet roll 4b set on the lower flange receivers 5b has the sloped portion 31c circled by a dotted line in FIG. 10 in the same manner as the sloped portion 39a provided to lower discharge guide plate 39. Specifically, the sloped portion 31c must be formed throughout a range through which the lower sheet roll 4b passes upon being set on the lower flange receivers 5b through the lower opening 8 along a direction 41 of attachment and detachment of the lower sheet roll 4b indicated by a thick double-headed arrow in FIG. 10. Accordingly, the lower sheet roll 4b having the assumed maximum outer diameter is set on the lower flange receivers 5b without contacting the surrounding components.

As illustrated in FIG. 11A, a configuration to engage the upper flange receivers 5a and the upper receiver stay 31 includes the upper receiver stay 31, a rack 42 provided within the upper receiver stay 31 to slide the upper flange receivers 5a to predetermined positions in the main scanning direction Y, and screws 43 that fix the upper flange receivers 5a to the rack 42. A width of each of the upper receiver stay 31 and the rack 42 is sufficient in the front and back direction X of the image forming apparatus 1 according to the first illustrative embodiment so that the upper receiver stay 31 can engage the upper flange receivers 5a with the screws 43 in a well-balanced manner in the front and back direction X of the image forming apparatus 1 relative to the center of gravity of the upper sheet roll 4a.

Figure 11B:
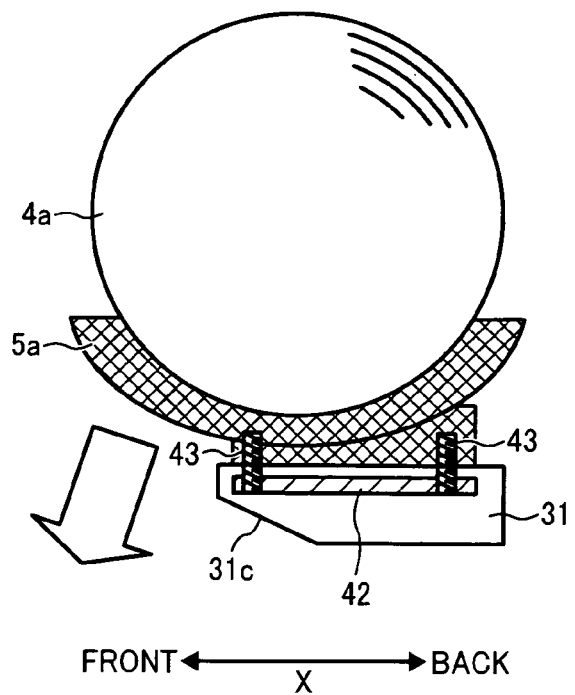
FIG. 11B is a vertical cross-sectional view illustrating engagement of the upper flange receiver and the receiver stay according to a comparative example of the first illustrative embodiment.

FIG. 11B is a vertical cross-sectional view illustrating engagement of the upper flange receiver 5a and the upper receiver stay 31 according to a comparative example of the first illustrative embodiment. When a size of the sloped portion 31c is increased as illustrated in FIG. 11B in order to give first priority to facilitation of setting of the lower sheet roll 4b on the lower flange receivers 5b, a width of the rack 42 in the front and back direction X of the image forming apparatus 1 and a span between the screws 43 are reduced, thereby unbalancing engagement of the upper receiver stay 31 and the upper flange receivers 5a in the front and back direction X of the image forming apparatus 1 relative to the center of gravity of the upper sheet roll 4a. Consequently, a heavy load is applied to the rack 42 and the upper receiver stay 31 toward the front of the image forming apparatus 1 as indicated by a thick arrow in FIG. 11B.

Although not shown in the drawings, a right-angle cutout may be provided to the upper receiver stay 31 in place of the sloped portion 31c illustrated in FIGS. 10 and 11A to achieve the same effects described above. As a result, similar to the first illustrative embodiment illustrated in FIGS. 10 and 11A, provision of the right-angle cutout can facilitate setting of the lower sheet roll 4b on the lower flange receivers 5b because the lower sheet roll 4b can be more easily put into the image forming apparatus 1 through the lower opening 8. Further, blot and damage to the lower sheet roll 4b caused by inadvertently contacting the image forming apparatus 1 upon setting of the lower sheet roll 4b can be prevented.

A description is now given of a first variation of the first illustrative embodiment described above, with reference to FIG. 12. FIG. 12 is a vertical cross-sectional view illustrating a configuration of the image forming apparatus 1 according to the first variation of the first illustrative embodiment. In place of the sloped portion 39a illustrated in FIGS. 8 and 9, the right-angle cutout 39b circled by a dotted line in FIG. 12 is provided to the lower discharge guide plate 39 positioned at the upper edge of the upper opening 7 in the first variation of the first illustrative embodiment. Specifically, a lower front corner of the lower discharge guide plate 39 is formed into the right-angle cutout 39b. The rest of the configuration of the first variation is the same as that of the first illustrative embodiment.

Similar to the sloped portion 39a in the first illustrative embodiment, the right-angle cutout 39b must be formed throughout a range through which the upper sheet roll 4a passes upon being set on the upper flange receivers 5a through the upper opening 7. Specifically, the right-angle cutout 39b is provided along the direction 40 of attachment and detachment of the upper sheet roll 4a such that the upper sheet roll 4a having the assumed maximum outer diameter is set on the upper flange receivers 5a without contacting the surrounding components.

Figure 13A:
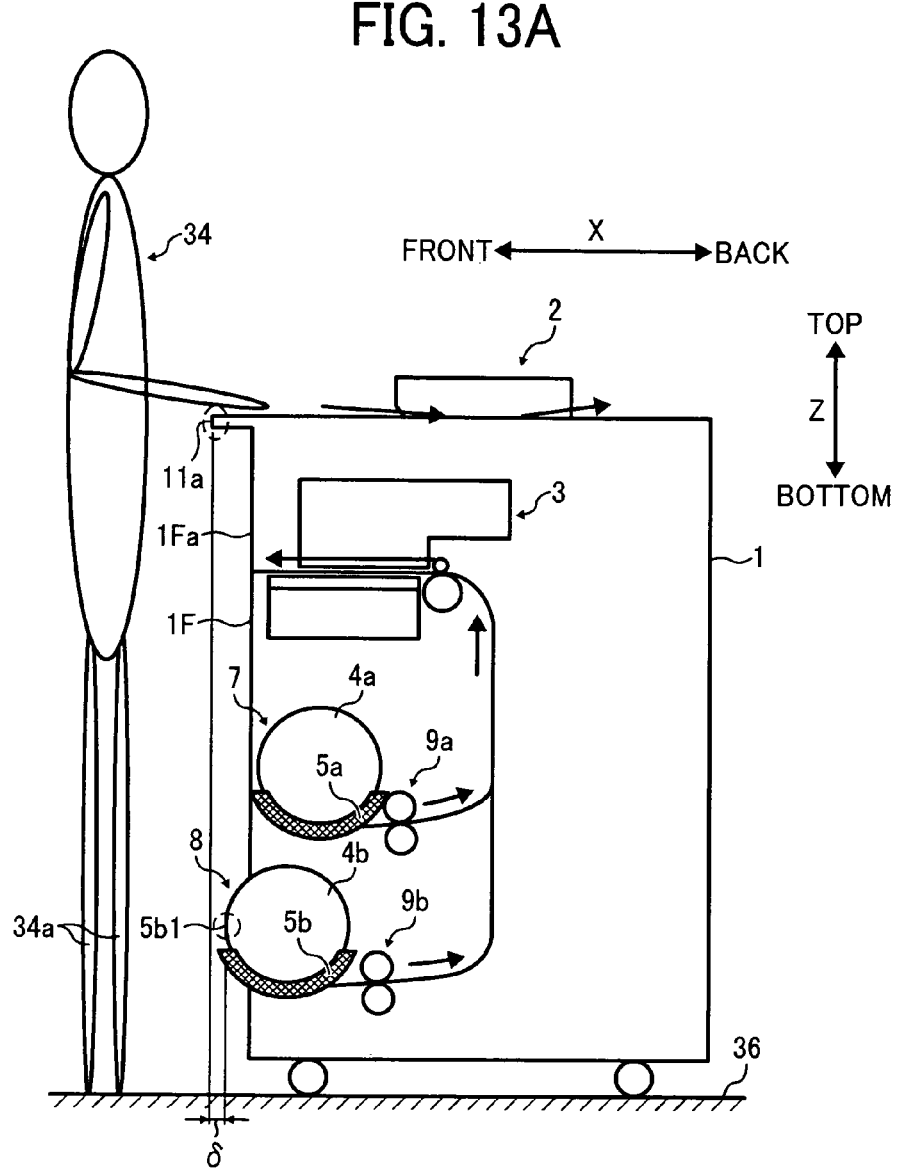
FIG. 13A is a vertical cross-sectional view illustrating a configuration of an image forming apparatus according to a second variation of the first illustrative embodiment.
Figure 13B:
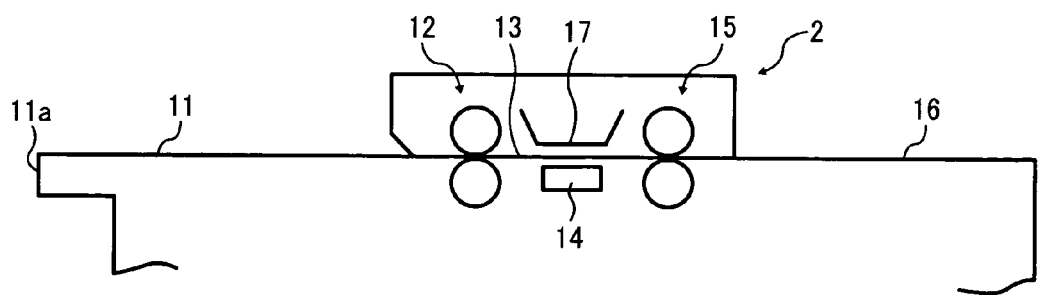
FIG. 13B is an enlarged vertical cross-sectional view illustrating an image reading unit of the image forming apparatus illustrated in FIG. 13A.

A description is now given of a second variation of the first illustrative embodiment. FIG. 13A is a vertical cross-sectional view illustrating a configuration of the image forming apparatus 1 according to the second variation of the first illustrative embodiment. FIG. 13B is an enlarged vertical cross-sectional view illustrating the image reading unit 2 of the image forming apparatus 1 illustrated in FIG. 13A.

The only differences between this second variation and the first illustrative embodiment illustrated in FIGS. 1 to 11A is that the document stand 11 has a forefront edge 11a (circled in the drawing) extended forward from the front edge 1Fa of the front surface 1F, and a front edge 5b1 of the maximum outer diameter of the lower sheet roll 4b set on the lower flange receivers 5b is positioned behind the forefront edge 11a of the document stand 11. The rest of the configuration of the image forming apparatus 1 according to the second variation is the same as that of the first illustrative embodiment.

Specifically, in the second variation of the first illustrative embodiment, the front edge 5b1 of the maximum outer diameter of the lower sheet roll 4b set on the lower flange receivers 5b is offset by 5 mm from the forefront edge 11a, which is positioned at the forefront of the document stand 11, toward the back of the image forming apparatus 1. The offset amount δ is appropriately decided taking into consideration the effects achieved by the first illustrative embodiment described above.

Referring to FIG. 13A, a user 34 stands in front of the front surface 1F of the image forming apparatus 1 to operate the image reading unit 2 to read the image of the document. At this time, the forefront edge 11a of the document stand 11 positioned in front of the front edge 5b1 of the maximum outer diameter of the lower sheet roll 4b prevents legs 34a of the user 34 from hitting against the front edge 5b1 of the lower sheet roll 4b or the front surface 1F of the image forming apparatus 1. Accordingly, the user 34 can operate the image forming apparatus 1 more comfortably.

Figure 14:
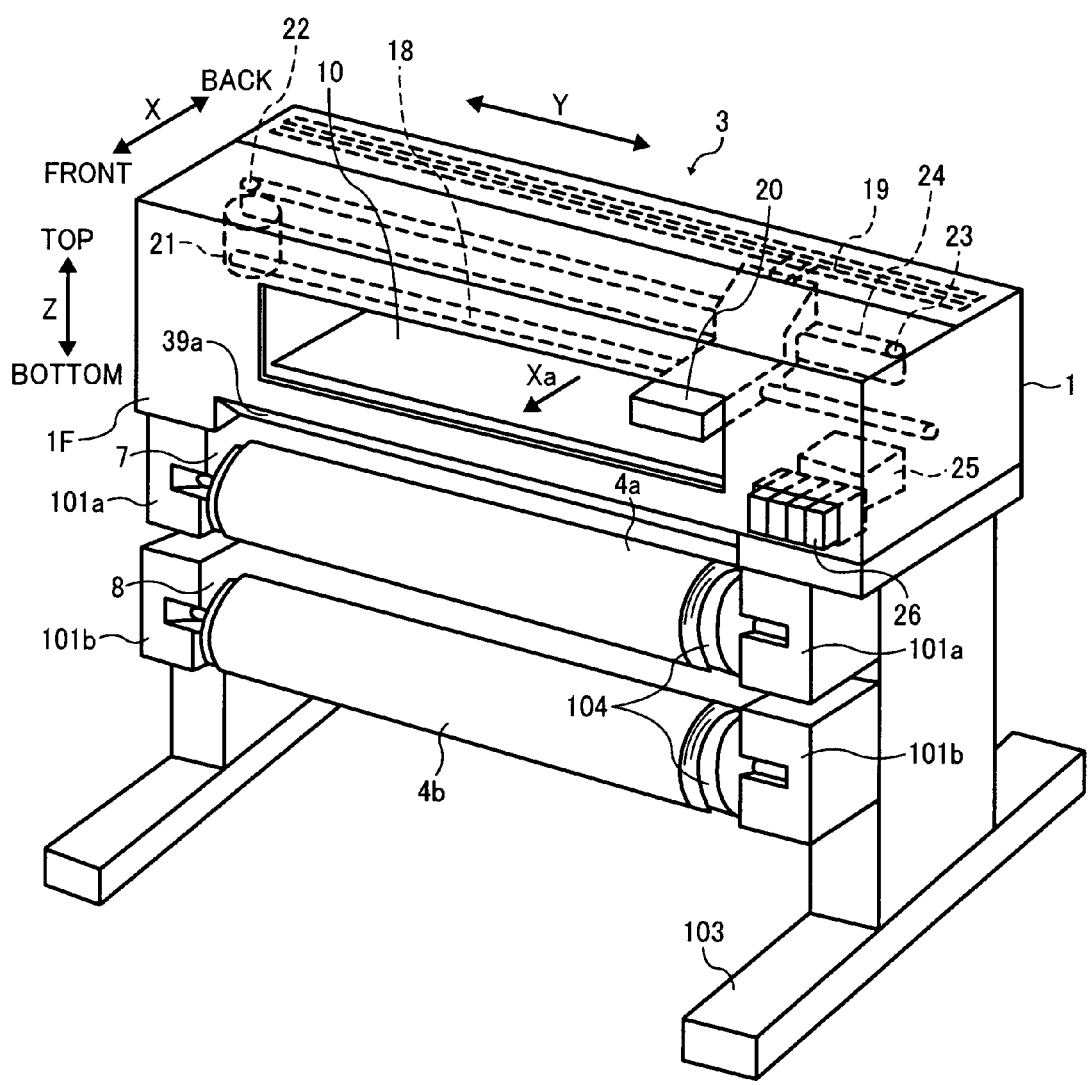
FIG. 14 is a perspective view illustrating an overall configuration of an image forming apparatus according to a second illustrative embodiment.
Figure 15:
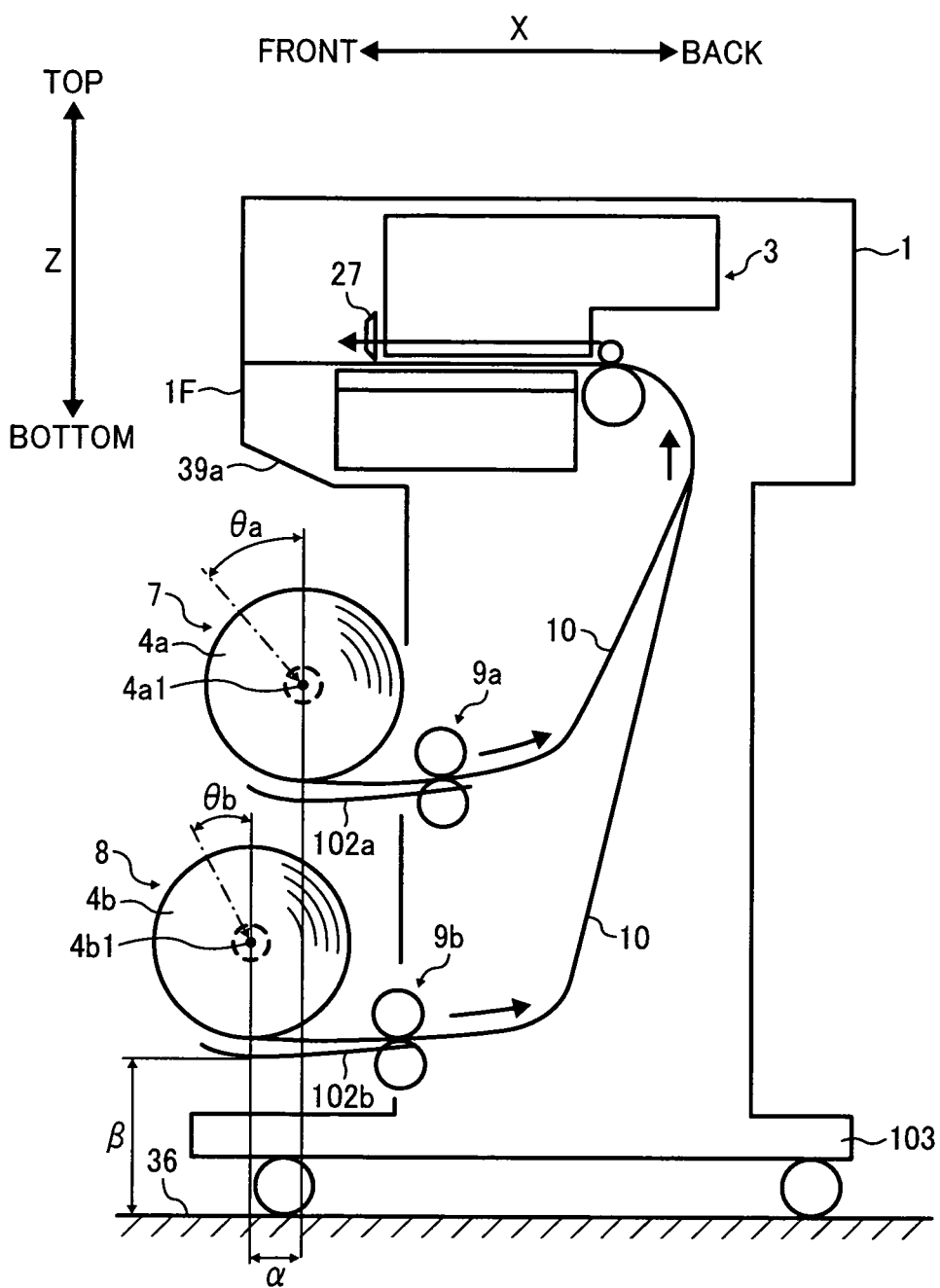
FIG. 15 is a vertical cross-sectional view illustrating the image forming apparatus illustrated in FIG. 14.
Figure 16:
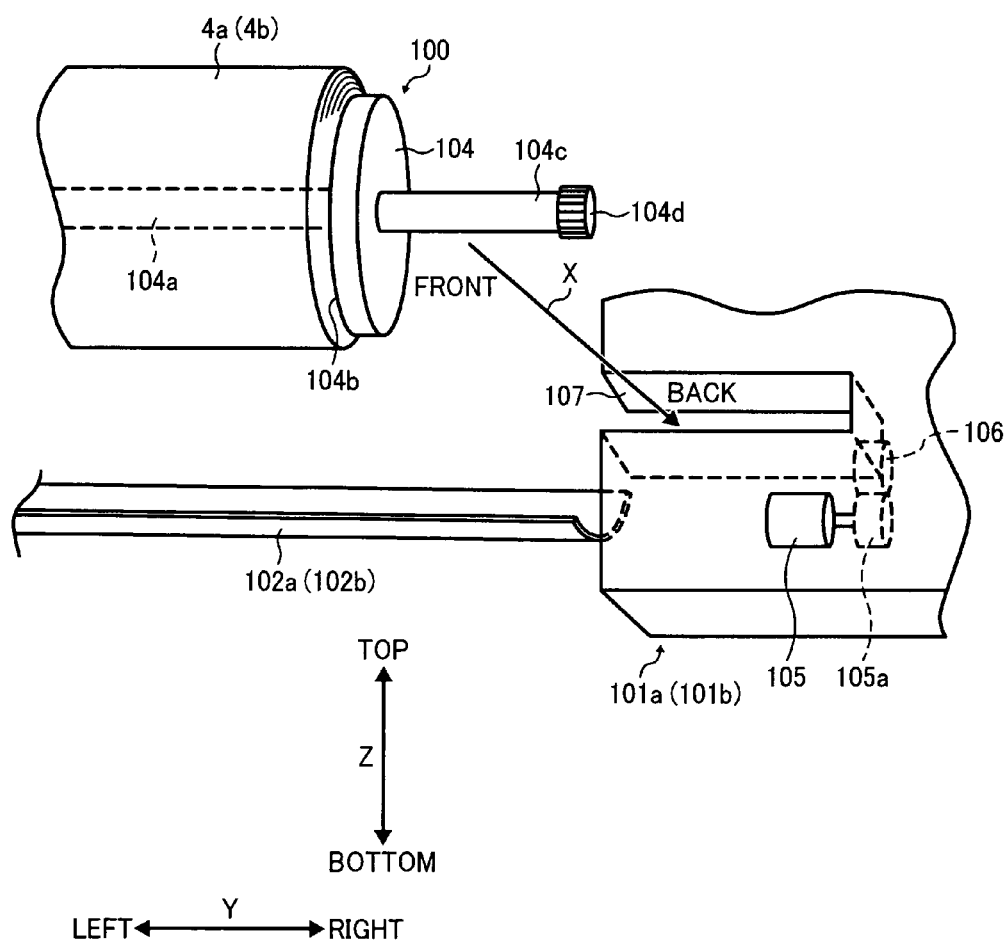
FIG. 16 is an enlarged perspective view illustrating relative positions of a spool attached to one end of one of upper and lower sheet rolls and one of upper and lower spool receivers according to the second illustrative embodiment viewed from the front.

A description is now given of a second illustrative embodiment of the present invention with reference to FIGS. 14 to 16.

FIG. 14 is a perspective view illustrating an overall configuration of the image forming apparatus 1 according to the second illustrative embodiment. FIG. 15 is a vertical cross-sectional view illustrating the image forming apparatus 1 illustrated in FIG. 14. FIG. 16 is an enlarged perspective view illustrating relative positions of a spool 100 attached to one end of one of the upper and lower sheet rolls 4a and 4b and one of upper and lower spool receivers 101a and 101b provided to the right of the image forming apparatus 1 according to the second illustrative embodiment viewed from the front.

One major difference between the first and second illustrative embodiments is that the second illustrative embodiment employs the spool system in place of the flange system of the first illustrative embodiment. Accordingly, in the second illustrative embodiment, the upper and lower spool receivers 101a and 101b are provided in place of the upper and lower flange receivers 5a and 5b, and the receiver stay 31 is not used. Further, in the second illustrative embodiment, upper and lower sheet roll guide members 102a and 102b are provided in place of the tapered portion 35, and a stand 103 is provided in place of the box-type housing for the upper and lower sheet rolls 4a and 4b provided at the bottom of the image forming apparatus 1 according to the first illustrative embodiment. The rest of the configuration of the second illustrative embodiment is the same as that of the first illustrative embodiment. It is to be noted that, in the second illustrative embodiment, the same components as the first illustrative embodiment are denoted by the same reference numerals used in the first illustrative embodiment, and the descriptions thereof are omitted.

A description is now given of the configuration and operation of the image forming apparatus 1 according to the second illustrative embodiment. Only differences from the first illustrative embodiment are described in detail below. It is to be noted that, although the image forming apparatus 1 illustrated in FIGS. 14 and 15 does not include the image reading unit 2, alternatively, the image forming apparatus 1 according to the second illustrative embodiment may include the image reading unit 2 above the image forming unit 3.

The upper and lower spool receivers 101a and 101b each serving as a sheet roll supporter are provided one above the other in the image forming apparatus 1 to respectively support the upper and lower sheet rolls 4a and 4b such that the sheet 10 is fed from each of the upper and lower sheet rolls 4a and 4b.

The upper sheet roll 4a is set on the upper spool receivers 101a through gears 104d and outer shafts 104c included in the spool 100. Similarly, the lower sheet roll 4b is set on the lower spool receivers 101b through gears 104d and outer shafts 104c included in the spool 100. As illustrated in FIGS. 14 and 15, the upper and lower sheet rolls 4a and 4b are set at the bottom of the image forming apparatus 1 on the front surface 1F side. The front surface 1F of the image forming apparatus 1 has the upper and lower openings 7 and 8 through which the upper and lower sheet rolls 4a and 4b are set, respectively.

The upper opening 7 for the upper spool receivers 101a is formed by the sloped portion 39a provided below the image forming unit 3, an inner surface of each of the upper spool receivers 101a, and the upper sheet roll guide member 102a. The lower opening 8 for the lower spool receivers 101b is formed by the upper sheet roll guide member 102a, an inner surface of each of the lower spool receivers 101b, and the lower sheet roll guide member 102b.

A description is now give of configurations of the spool 100 and the upper and lower spool receivers 101a and 101b and procedures to set the upper and lower sheet rolls 4a and 4b.

It is to be noted that the procedures to set the spools 100 attached to the two ends of the upper sheet roll 4a on the upper spool receivers 101a are the same as the procedures to set the spools 100 attached to the two ends of the lower sheet roll 4b on the lower spool receivers 101b. Therefore, the procedures to set the spools 100 attached to the two ends of the upper sheet roll 4a on the upper spool receivers 101a are described in detail below as representative with reference to FIG. 16, and the reference numerals 4b, 101b, and 102b respectively denoting the lower sheet roll, the lower spool receivers, and the lower sheet roll guide member are parenthesized in FIG. 16.

As illustrated in FIG. 16, the spool 100 includes an insertion shaft 104a passing through the paper core of the upper sheet roll 4a, a spool flange 104 fixed to one end of the outer shaft 104c, the outer shaft 104c inserted into a spool shaft guide groove 107, and the gear 104d fixed to the other end of the outer shaft 104c. The spool flange 104 has a shape of a truncated cone similar to the shape of each of the upper and lower flange members 6a and 6b used in the first illustrative embodiment, and includes a restriction member 104b that contacts one end of the upper sheet roll 4a in the longitudinal direction thereof to prevent the upper sheet roll 4a from moving in the longitudinal direction thereof. The gear 104d engages a connection gear 106 provided to the upper spool receiver 101a so that a drive force from a drive motor 105 is transmitted.

The upper spool receiver 101a is fixed to both right and left plates of the image forming apparatus 1 in the main scanning direction Y corresponding to a length of the spool shaft compatible with the maximum width of the sheet 10 used in the image forming apparatus 1. The upper spool receiver 101a includes the spool shaft guide groove 107 into which the outer shaft 104c of the spool 100 is inserted, the connection gear 106 that engages the gear 104d fixed to the other end of the outer shaft 104c of the spool 100 inserted into the spool shaft guide groove 107, and the drive motor 105 having a drive gear 105a on an output shaft thereof. The drive gear 105a engages the connection gear 106.

An example of the procedures to set the upper sheet roll 4a in the image forming apparatus 1 using the spool system is described in detail below. First, the insertion shaft 104a fixed to the other end of the spool flange 104, the one end of which is fixed to the outer shaft 104c, is inserted into the paper core of the upper sheet roll 4a from one end of the paper core, that is, the right end of the paper core in FIG. 16. Next, a slidable spool flange, not shown, is inserted into the spool shaft composed of the insertion shaft 104a and the outer shaft 104c positioned on the left in the FIG. 16, not shown. The spool flange 104 on the right and the spool flange on the left are fixed to the two ends of the paper core of the upper sheet roll 4a, respectively, using well-known lock and fixing means, and the spool flange on the left is locked to the spool shaft on the left so that the spools 100 are set to the two ends of the upper sheet roll 4a. Thereafter, the upper sheet roll 4a to which the spools 100 are attached is set on the upper spool receivers 101a.

The method and configuration for attaching the spools 100 to the upper sheet roll 4a are not limited to the example described above. Alternatively, well-known techniques respectively disclosed in Japanese Patent No. 3590866 and Published Unexamined Japanese Patent Application Nos. H10-198097 and H11-116109 may be used.

The upper and lower sheet roll guide members 102a and 102b are provided to the front of the image forming apparatus 1 along the rotary shaft of each of the upper and lower sheet rolls 4a and 4b respectively set on the upper and lower spool receivers 101a and 101b to guide the sheet 10 fed from each of the upper and lower sheet rolls 4a and 4b. In other words, the upper and lower sheet roll guide members 102a and 102b have the same function as the tapered portion 35 provided to the receiver stay 31 in the first illustrative embodiment. Further, the upper sheet roll guide member 102a also functions in the same way as the sloped portion 31c of the receiver stay 31 in the first illustrative embodiment. Specifically, the upper sheet roll guide member 102a can also function as a sloped portion tilting downward from the front surface 1F to the back of the image forming apparatus 1 to form the upper edge of the lower opening 8 for the lower spool receivers 101b.

Excluding the example illustrated in FIG. 11A, the first illustrative embodiment and the first and second variations of the first illustrative embodiment are applicable to the second illustrative embodiment. In such a case, the upper and lower spool receivers 101a and 101b are used in place of the upper and lower flange receivers 5a and 5b shown in FIGS. 1 to 10, 12, and 13.

As described above, the simple configuration according to the second illustrative embodiment can facilitate setting of the upper and lower sheet rolls 4a and 4b in the image forming apparatus 1. In addition, a distance between the upper and lower sheet rolls 4a and 4b respectively set on the upper and lower spool receivers 101a and 101b can be reduced, thereby enabling the image forming apparatus 1 to be made more compact. Accordingly, a height of the image forming apparatus 1 can also be reduced so that the user can more easily access the document stand 11 provided at the top of the image forming apparatus 1 to place the document to be read on the document stand 11. Further, blot and damage to the upper and lower sheet rolls 4a and 4b caused by inadvertently contacting the image forming apparatus 1 upon setting of the upper and lower sheet rolls 4a and 4b can be prevented.

Although the sloped portion 39a is formed below the image forming unit 3 to form the upper edge of the upper opening 7 for the upper spool receivers 101a in the second illustrative embodiment, alternatively, the sloped portion 39a according to the second illustrative embodiment need not be tilted in the same manner as described in the first illustrative embodiment.

It is to be noted that illustrative embodiments of the present invention are not limited to those described above, and various modifications and improvements are possible without departing from the scope of the present invention. It is therefore to be understood that, within the scope of the associated claims, illustrative embodiments may be practiced otherwise than as specifically described herein. For example, elements and/or features of different illustrative embodiments may be combined with each other and/or substituted for each other within the scope of the illustrative embodiments.

For example, the image reading unit 2, the image forming unit 3, and the upper and lower flange receivers 5a and 5b or the upper and lower spool receivers 101a and 101b are not limited to the examples described above, and alternatively, well-known components same as the above-described examples may be used. For example, the image forming unit 3 is not limited to a serial-type inkjet recording device. Alternatively, a line type inkjet recording device, an image forming device employing an electrophotographic method, or a device having two or more of the functions of the serial-type inkjet recording device, the line type inkjet recording device, and the image forming device employing the electrophotographic method may be used as the image forming unit 3. Further, the image forming apparatus 1 may include an operation panel serving as an operation unit at the top to the front thereof in addition to the image reading unit 2. The number of the flange receivers or the spool receivers each supporting the sheet roll is not limited to two. Alternatively, the number of the flange receivers or the spool receivers may be three or more. In other words, at least the two sheet roll supporters are provided one above the other in the image forming apparatus 1.

What is claimed is:

1. An image forming apparatus, comprising:
an image reading unit to read an image of a document, disposed in an upper portion of the image forming apparatus;
an image forming unit to form the image on a sheet, disposed below the image reading unit;
an upper sheet roll supporter and a lower sheet roll supporter provided one above the other below the image forming unit to support an upper lower sheet roll and a lower sheet roll, respectively, each sheet roll being formed of a single long sheet wound around a core, in which the lower sheet roll supporter is offset in relationship to the upper sheet roll supporter; and
an upper opening and a lower opening provided in a front surface of the image forming apparatus through which the upper sheet roll and the lower sheet roll, respectively, are set to the upper sheet roll supporter and the lower sheet roll supporter from the front surface of the image forming apparatus, wherein the lower sheet roll supporter has a portion protruding forward beyond a front end surface located at a front most side of the image forming apparatus in a sheet feedable state.

2. The image forming apparatus according to claim 1, wherein:
the image reading unit includes a document stand on which the document is placed to convey the document to an image reading position from the front surface side to the back of the image forming apparatus; and
a front edge of a sheet roll of a maximum accommodatable outer diameter set to the lower sheet roll supporter is positioned distal of a front edge of the document stand.

3. The image forming apparatus according to claim 1, wherein an upper edge of the opening for the upper sheet roll supporter has a sloped portion tilting downward from the front surface to the back of the image forming apparatus.

4. The image forming apparatus according to claim 1, wherein an upper edge of the opening for the lower sheet roll supporter has a sloped portion tilting downward from the front surface to the back of the image forming apparatus.

5. The image forming apparatus according to claim 1, wherein an upper edge of the opening for the upper sheet roll supporter has a right-angle cutout therein, in which the upper edge is cut off.

6. The image forming apparatus according to claim 1, wherein the lower sheet roll supporter is disposed close to a surface on which the image forming apparatus rests.

7. The image forming apparatus according to claim 1, wherein the at least upper and lower sheet roll supporters are dimensioned and oriented such that an angle of loading of the sheet roll into the lower sheet roll supporter is more acute relative to a virtual vertical line than an angle of loading of the sheet roll into the upper sheet roll supporter.

8. The image forming apparatus according to claim 1, further comprising a support member that supports the upper sheet roll,
wherein the support member is provided to an upper edge of the opening for the lower sheet roll supporter and has a sloped portion tilting downward from the front surface to the back of the image forming apparatus.

9. The image forming apparatus according to claim 8, wherein the upper sheet roll supporter is slidably attached to the support member extended in a longitudinal direction of the upper sheet roll.

10. The image forming apparatus according to claim 8, wherein the support member holds the upper sheet roll supporter provided at two ends of the upper sheet roll in a main scanning direction.

11. The image forming apparatus according to claim 8, wherein the support member includes a rack provided within the support member to slide an upper guide member to preset positions in a main scanning direction.

12. The image forming apparatus according to claim 8, wherein the support member includes a tapered portion to guide the sheet fed from the upper sheet roll set on an upper sheet roll supporter.

13. The image forming apparatus according claim 1, wherein the upper sheet roll is set on the upper sheet roll supporter through an upper guide member, and the lower sheet roll is set on the lower sheet roll supporter through a lower guide member.

14. The image forming apparatus according to claim 13, wherein the upper guide member is inserted into the upper sheet roll supporter, and the lower guide member is inserted into the lower sheet roll supporter.

15. The image forming apparatus according to claim 13, wherein the upper guide member and lower guide member are fixed to the two ends of the core of the upper sheet roll and the lower sheet roll, respectively, along an axis of the core thereof.

16. The image forming apparatus according to claim 13, wherein each of the upper guide member and the lower guide member includes a large disk that contacts one end of the upper sheet roll or the lower sheet roll and a small cylinder inserted into the core of the upper sheet roll or the lower sheet roll.

17. The image forming apparatus according to claim 1, further comprising an upper and lower discharge guide plates to guide the sheet having an image thereon cut to a preset length by a cutter to a discharge tray.

18. The image forming apparatus according to claim 17, wherein the lower discharge guide plate is positioned at the upper edge of the upper opening to enclose a front surface of a suction fan.

19. The image forming apparatus according to claim 17, wherein the lower discharge guide plate has a sloped portion, which is tilted downward from the front surface toward the back of the image forming apparatus.

* * * * *